(12) United States Patent
Hara et al.

(10) Patent No.: US 10,174,426 B2
(45) Date of Patent: *Jan. 8, 2019

(54) COATED METAL SHEET, METHOD FOR MANUFACTURING SAME, AND EXTERIOR BUILDING MATERIAL

(71) Applicant: NISSHIN STEEL CO., LTD., Tokyo (JP)

(72) Inventors: Taketo Hara, Chiba (JP); Koichiro Ueda, Chiba (JP); Kenji Sakato, Chiba (JP); Kazuhiko Takahashi, Chiba (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/313,714

(22) PCT Filed: Dec. 16, 2014

(86) PCT No.: PCT/JP2014/006267
§ 371 (c)(1),
(2) Date: Nov. 23, 2016

(87) PCT Pub. No.: WO2015/181863
PCT Pub. Date: Dec. 3, 2015

(65) Prior Publication Data
US 2017/0145569 A1    May 25, 2017

(30) Foreign Application Priority Data

May 29, 2014 (JP) .................................. 2014-111302
Aug. 12, 2014 (JP) .................................. 2014-164256

(51) Int. Cl.
C23C 26/00      (2006.01)
B05D 7/14       (2006.01)
(Continued)

(52) U.S. Cl.
CPC ................ C23C 26/00 (2013.01); B05D 1/02 (2013.01); B05D 1/18 (2013.01); B05D 1/28 (2013.01);
(Continued)

(58) Field of Classification Search
CPC .. C23C 26/00; B05D 1/30; B05D 1/02; B05D 1/18; B05D 1/28
(Continued)

(56) References Cited

U.S. PATENT DOCUMENTS

2011/0236632 A1 * 9/2011 Hosokawa ............. B05D 5/063
428/141
2017/0218519 A1 * 8/2017 Hara ..................... C23C 16/511
(Continued)

FOREIGN PATENT DOCUMENTS

JP    H05-220449 A    8/1993
JP    H07-276561 A    10/1995
(Continued)

OTHER PUBLICATIONS

International Search Report from International Application No. PCT/JP2014/006267 dated Jan. 20, 2015.

*Primary Examiner* — William K Cheung
(74) *Attorney, Agent, or Firm* — Brundidge & Stanger, P.C.

(57) ABSTRACT

The coated metal plate pertaining to the present invention is a coated metal plate for exterior use, and has a metal plate and a top coating film disposed on the metal plate. The top coating film contains 0.01-15 vol % of porous particles as a gloss adjusting agent, and the coated metal plate satisfies the expressions below. In the expressions below, R is the number-average particle diameter (μm), $D_{97.5}$ is the diameter (μm) of 97.5% of the particles, Ru is the upper limit particle diameter (μm), and T is the film thickness (μm) of the top (Continued)

coating film in the number particle size distribution of the gloss adjusting agent. $D_{97.5}/T \leq 0.7$; $Ru \leq 1.2T$; $R \geq 1.0$; $3 \leq T \leq 20$.

15 Claims, 7 Drawing Sheets

(51) Int. Cl.
  *B05D 7/24* (2006.01)
  *B32B 15/08* (2006.01)
  *E04F 13/12* (2006.01)
  *B05D 1/02* (2006.01)
  *B05D 1/18* (2006.01)
  *B05D 1/28* (2006.01)
  *B05D 1/30* (2006.01)

(52) U.S. Cl.
  CPC ............... *B05D 1/30* (2013.01); *B05D 7/14* (2013.01); *B05D 7/24* (2013.01); *B32B 15/08* (2013.01); *E04F 13/12* (2013.01)

(58) Field of Classification Search
  USPC .......................................................... 428/331
  See application file for complete search history.

(56) References Cited

U.S. PATENT DOCUMENTS

2017/0226366 A1* 8/2017 Hara .................... C09D 127/16
2017/0226645 A1* 8/2017 Hara .................... C23C 24/082

FOREIGN PATENT DOCUMENTS

| | | |
|---|---|---|
| JP | 2007-007562 A | 1/2007 |
| JP | 2011-148107 A | 8/2011 |
| JP | 2012-214010 A | 11/2012 |
| WO | 2012/029977 A1 | 3/2012 |

* cited by examiner

COATED METAL SHEET, METHOD FOR MANUFACTURING SAME, AND EXTERIOR BUILDING MATERIAL

This application is a national stage of PCT International Application No. PCT/JP2014/006267 filed in Japan on Dec. 16, 2014, which claims priority to Japanese Patent Application No. 2014-111302 filed in Japan on May 29, 2014, and Japanese Patent Application No. 2014-164256 filed in Japan on Aug. 12, 2014, all of which are hereby expressly incorporated by reference.

TECHNICAL FIELD

The present invention relates to a coated metal sheet for exterior use, a production method therefor, and an exterior building material.

BACKGROUND ART

Coated metal sheets, excellent in versatility, designability, durability and the like, have been used in various applications. In coated metal sheets for exterior building material applications, mainly from the viewpoint of designability, a gloss adjusting agent is usually blended in an overcoat coating film which is a surface of the coated metal sheet surface. Silica particles are usually used as the gloss adjusting agent in the coated metal sheets for exterior building materials. The particle diameter of the silica particles is usually specified by an average particle diameter. The average particle diameter of the silica particles as the gloss adjusting agent in the coated metal sheet is usually from 3 to 30 μm, depending on the color and the application (for example, see PTL 1 (paragraph 0018)).

CITATION LIST

Patent Literature

PTL 1
Japanese Patent Application Laid-Open No. 2011-148107

SUMMARY OF INVENTION

Technical Problem

As coated metal sheets for exterior building materials, chromate-coated steel sheets are used. Efforts have been made to improve the molding processability or the corrosion resistance at cut ends for the chromate-coated steel sheets, which thus have had long-term durability. Meanwhile, strong interest has been shown to environmental preservation in recent years also in the technical field of exterior building materials. Accordingly, legal regulations to ban the use of components that adversely affect or cause a concern about possibility of adversely affecting the environment have been under consideration. For example, restriction of the use of hexavalent chromium components, generally used in coated metal sheets as an anti-rust component, in the near future is under consideration. Also for chromate-free coated steel sheets, various considerations have been made such as pre-coating treatment, optimization of anti-rust pigments and the like, and characteristics obtained at molding processed portions and cut ends are comparable to those of the chromate-coated steel sheets.

However, the corrosion resistance of the flat portion in chromate-coated steel sheets did not lead to a large problem, while corrosion in the flat portion in chromate-free coated steel sheets may become severe. Particularly when silica particles are used as the gloss adjusting agent, corrosion such as stain rust, coating film blistering and the like, in the flat portion has occurred during actual use in some cases, before the intended age of service, as shown in FIG. 1.

An object of the present invention is to provide a coated metal sheet and an exterior building material that have an intended designability with a gloss adjusted as well as, even being chromate-free, have excellent flat-portion corrosion resistance equivalent to or greater than that of coated metal sheets comprising a chromate anti-rust treated metal sheet.

Solution to Problem

The present inventors have intensively studied causes of the aforementioned corrosion in the flat portion. FIG. 2 is a micrograph of a corroded portion in the flat portion of a chromate-free coated metal sheet. In FIG. 2, portion A is a portion where silica particles as a gloss adjusting agent are exposed from the overcoat coating film, and portion B is a portion where the silica particles have fallen off from the overcoat coating film. FIG. 3 is a reflection electron micrograph of a cross section along line L, in FIG. 2, in portion A of the coated metal sheet. FIG. 4 is a reflection electron micrograph of a cross section along line L, in FIG. 2, in portion B of the coated metal sheet. FIG. 3 clearly shows the occurrence of cracks at the silica particles exposed on the surface of the overcoat coating film, and FIG. 4 clearly shows that corrosion of the metal sheet originates from the holes in the overcoat coating film from which the silica particles have fallen off.

As described above, the present inventors have confirmed that, when particles having micropores such as silica are used as the gloss adjusting agent, the corrosion occurs in a portion where the gloss adjusting agent in the overcoat coating film has cracked, collapsed, or fallen off, and also that the gloss adjusting agent exposed from the overcoat coating film to be worn in actual use cracks, collapses and falls off from the overcoat coating film.

The present inventors have also investigated the gloss adjusting agent to thereby confirm that the silica particles specified by an average particle diameter contain particles considerably larger than the average particle diameter relative to the thickness of the overcoat coating film. For example, when observing, among commercially available silica particles to be used as the gloss adjusting agent, silica particles having an average particle diameter of 3.3 μm with an electron microscope, the present inventors have confirmed that silica particles having a particle diameter of about 15 μm are contained (FIG. 5). Additionally, the present inventors have observed the surface of the silica particles (portion B in FIG. 6A) and have confirmed that numberless minute gaps, which are specific to aggregated particles, are open to the surface (FIG. 6B).

Then, the present inventors, focusing on the fact that such aggregated particles having a large particle diameter decrease the corrosion resistance, have found that, by use of a gloss adjusting agent having a specific particle diameter relative to the thickness of the overcoat coating film, corrosion resistance can be obtained equivalent to or greater than the corrosion resistance achieved by chromate-based chemical conversion treatment and by use of a chromium-containing anti-rust pigment in an undercoat coating film in conventional metal sheets, having completed the present invention.

Thus, the present invention relates to a coated metal sheet and an exterior building material below.

[1] A coated metal sheet including a metal sheet and an overcoat coating film to be disposed on the metal sheet, in which the overcoat coating film includes particles having micropores as a gloss adjusting agent, in which the content of the gloss adjusting agent in the overcoat coating film is from 0.01 to 15 vol %, and in which the coated metal sheet satisfies the following expressions:

$D_{97.5}/T \leq 0.7$ $Ru \leq 1.2T$ $R \geq 1.0$ $3 \leq T \leq 20$ in which R (μm) is a number average particle diameter of the gloss adjusting agent, T (μm) is a film thickness of the overcoat coating film, $D_{97.5}$ (μm) is a 97.5% particle diameter in an accumulated particle size distribution of the gloss adjusting agent based on the number of particles, and Ru (μm) is an upper limit particle diameter in a number particle size distribution of the gloss adjusting agent.

[2] The coated metal sheet according to [1], in which the R is 2.0 or more, and the T is 9 or more and 19 or less.

[3] The coated metal sheet according to [1] or [2], in which the Ru is less than T.

[4] The coated metal sheet according to any one of [1] to [3], in which the metal sheet has been subjected to non-chromate anti-rust treatment, and the coated metal sheet is chromate-free.

[5] The coated metal sheet according to any one of [1] to [3], in which the metal sheet has been subjected to chromate anti-rust treatment.

[6] The coated metal sheet according to any one of [1] to [5], in which the gloss adjusting agent is silica particles.

[7] The coated metal sheet according to any one of [1] to [6], further including an undercoat coating film between the metal sheet and the overcoat coating film.

[8] The coated metal sheet according to [7], further including an intercoat coating film between the undercoat coating film and the overcoat coating film.

[9] The coated metal sheet according to any one of [1] to [8], having a glossiness at 60° is 20 to 85.

[10] The coated metal sheet according to any one of [1] to [9], being a coated metal sheet for exterior use.

[11] An exterior building material composed of the coated metal sheet according to any one of [1] to [9].

Also, the present invention relates to a method for producing a coated metal sheet below.

[12] A method for producing a coated metal sheet having a metal sheet and an overcoat coating film to be disposed on the metal sheet, including the steps of: applying an overcoat coating material containing a resin and a gloss adjusting agent onto the metal sheet; and curing the coating film of the overcoat coating material to form the overcoat coating film; in which the content of the gloss adjusting agent in the overcoat coating film is from 0.01 to 15 vol %, in which the gloss adjusting agent is particles having micropores, and in which the gloss adjusting agent which satisfies the following expressions is employed:

$D_{97.5}/T \leq 0.7$ $Ru \leq 1.2T$ $R \geq 1.0$ $3 \leq T \leq 20$ in which R (μm) is a number average particle diameter of the gloss adjusting agent, T (μm) is a film thickness of the overcoat coating film, $D_{97.5}$ (μm) is a 97.5% particle diameter in an accumulated particle size distribution of the gloss adjusting agent based on the number of particles, and Ru (μm) is an upper limit particle diameter in a number particle size distribution of the gloss adjusting agent.

[13] The method for producing a coated metal sheet according to [12], in which the R is 2.0 or more, and the T is 9 or more and 19 or less.

[14] The method for producing a coated metal sheet according to [12] or [13], in which the overcoat coating material has been subjected to treatment for pulverizing the particles in the overcoat coating material.

Advantageous Effects of Invention

The present invention prevents exposure, cracking and the like of the gloss adjusting agent at the intended age of service. As a result, there is provided a coated metal sheet that has intended designability having an adjusted gloss as well as, even being chromate-free, has excellent flat-portion corrosion resistance equivalent to or greater than that of coated metal sheets comprising a chromate anti-rust treated metal sheet.

DESCRIPTION OF EMBODIMENTS

Figure 1:
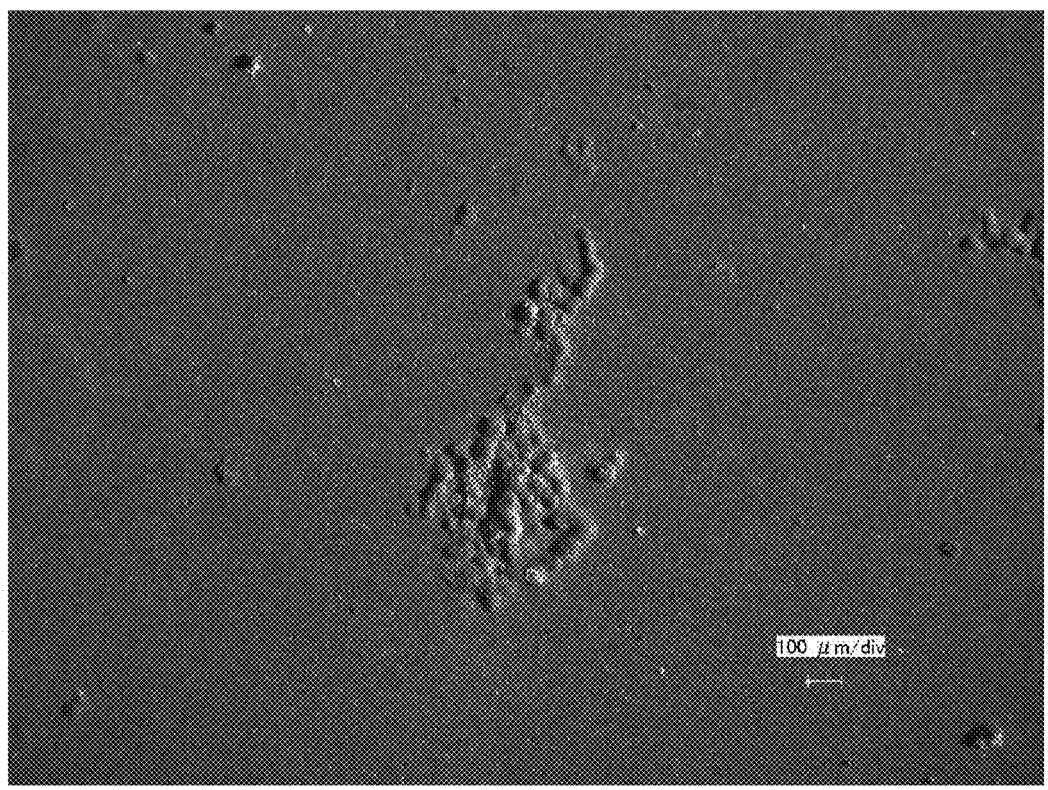
FIG. 1 is a micrograph of a corroded portion (coating film blistering) occurring in the flat portion of a chromate-free coated metal sheet in actual use of five years.
Figure 2:
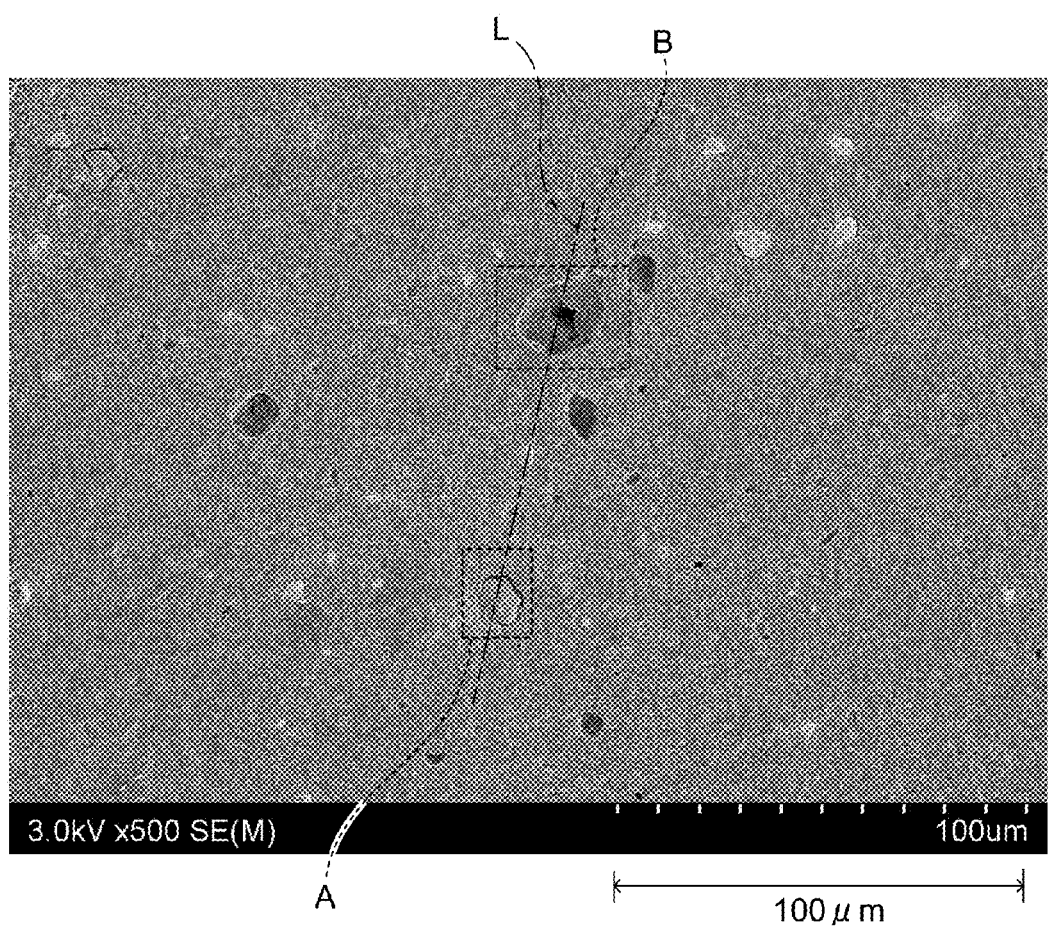
FIG. 2 is a micrograph of a corroded portion in the flat portion of the chromate-free coated metal sheet.
Figure 3:
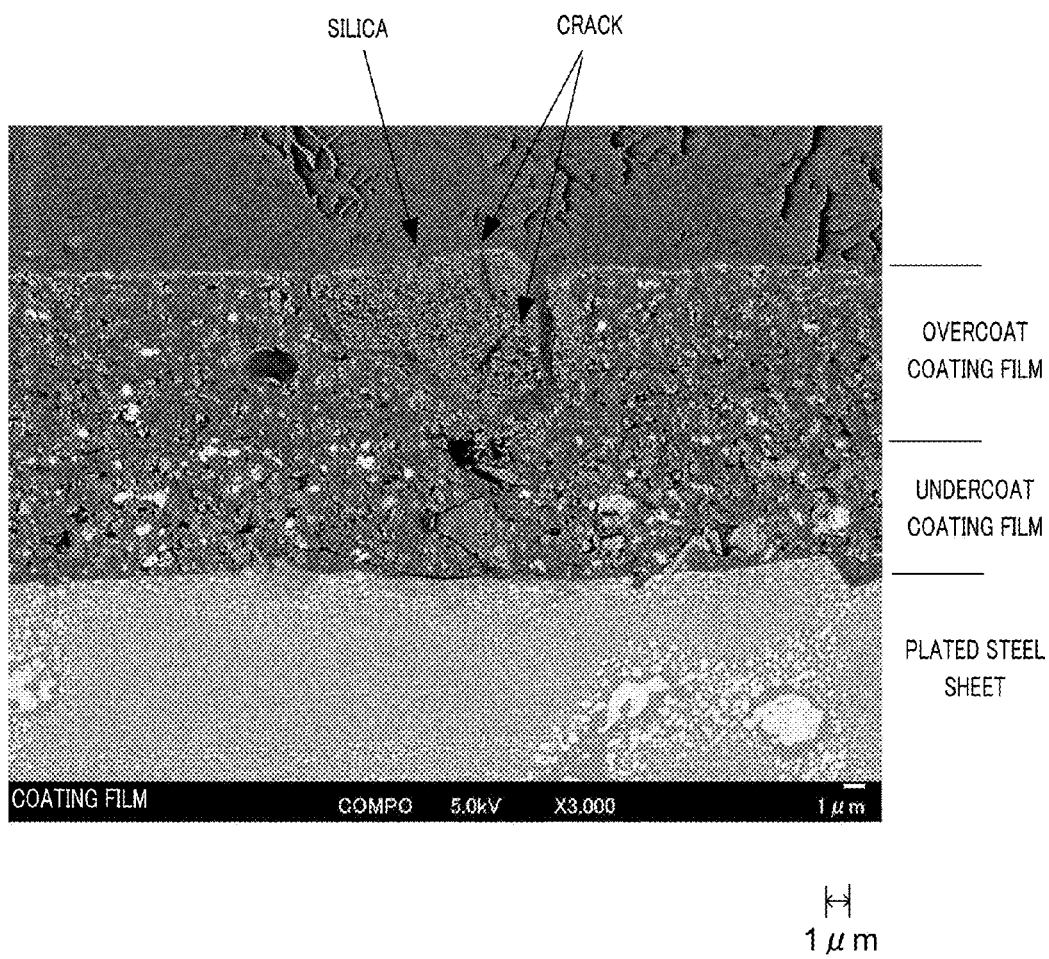
FIG. 3 is a reflection electron micrograph of a cross section along line L, in FIG. 2, in portion A of the coated metal sheet shown in FIG. 2.
Figure 4:
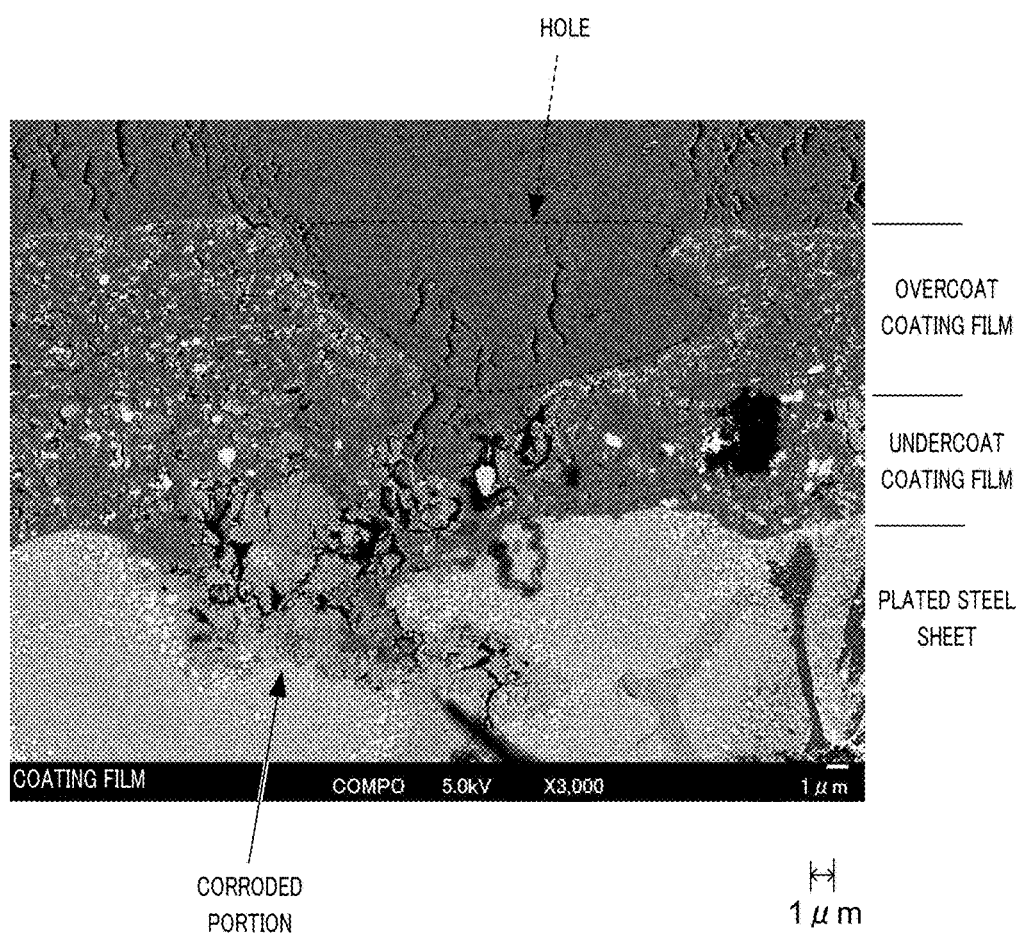
FIG. 4 is a reflection electron micrograph of a cross section along line L, in FIG. 2, in portion B of the coated metal sheet shown in FIG. 2.
Figure 5:
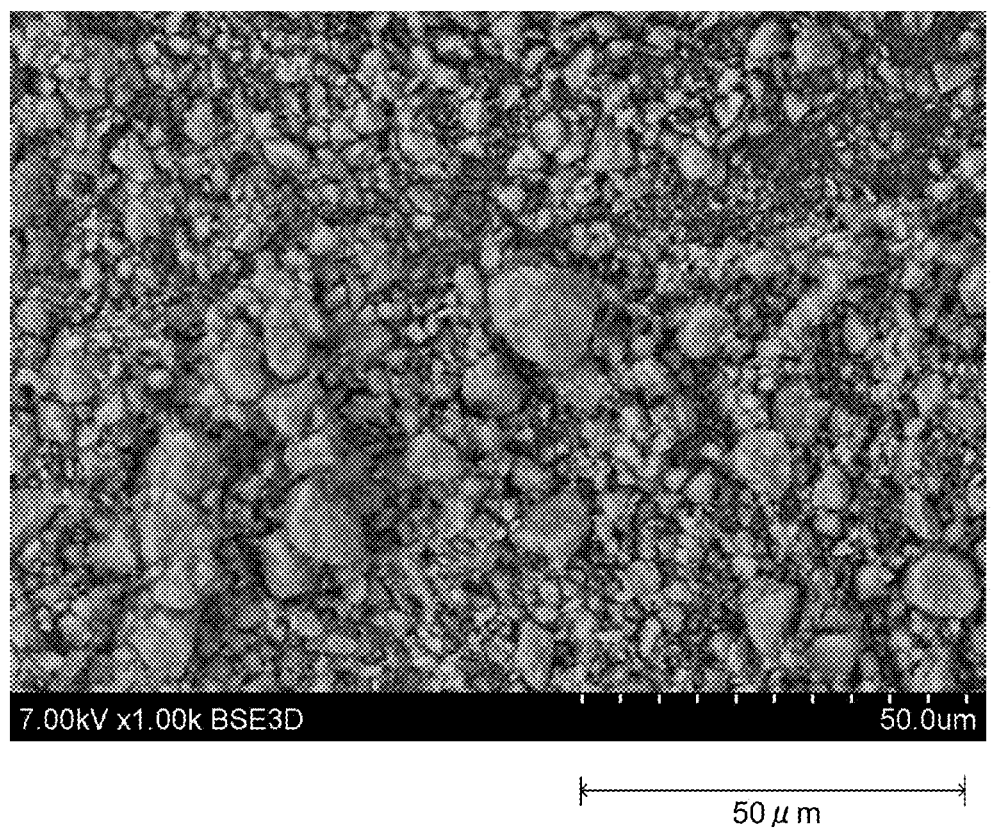
FIG. 5 is an electron micrograph of commercially available silica particles having an average particle diameter of 3.3 μm.
Figure 6A:
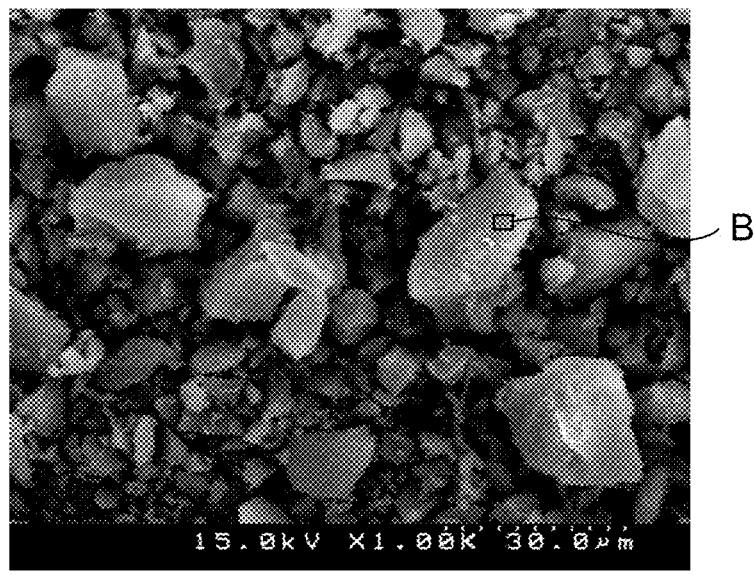
FIG. 6A is an electron micrograph of commercially available silica particles.
Figure 6B:
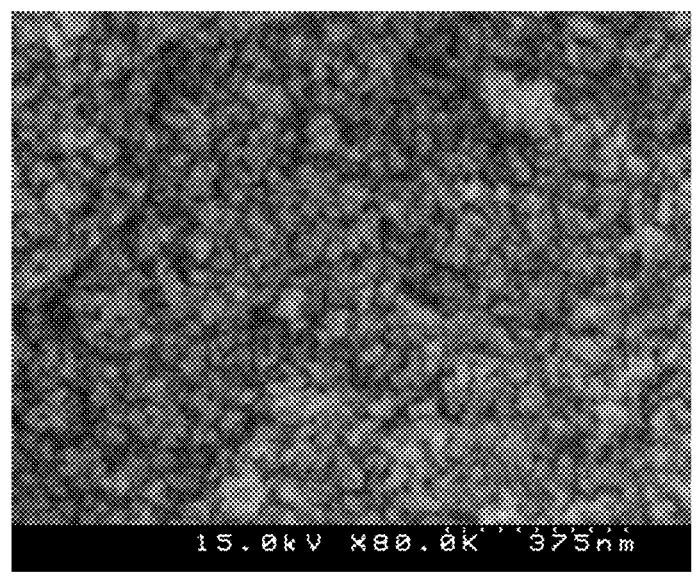
FIG. 6B is an enlarged electron micrograph of portion B in FIG. 6A.

Hereinafter, the coated metal sheet according to one embodiment of the present invention will be described. The coated metal sheet includes a metal sheet and an overcoat coating film to be disposed on/above the metal sheet.

The metal sheet can be selected from known metal sheets as far as the effect of the present embodiment can be achieved. Examples of the metal sheet include cold-rolled steel sheets, galvanized steel sheets, Zn—Al alloy-plated steel sheet, Zn—Al—Mg alloy-plated steel sheets, aluminum-plated steel sheets, stainless steel sheets (including austenitic, martensitic, ferritic, and ferrite-martensite two-phase systems), aluminum sheets, aluminum-alloy sheets, copper sheets and the like. The metal sheets are preferably plated steel sheets from the viewpoint of corrosion resistance, lighter weight, and cost-effectiveness. The plated steel sheet is preferably hot-dip 55% Al—Zn alloy-plated steel sheets, Zn—Al—Mg alloy-plated steel sheets, or aluminum-plated steel sheets, particularly from the viewpoint of corrosion resistance and from the viewpoint of suitability for exterior building materials.

The metal sheet preferably has a chemical conversion film on its surface, from the viewpoint of improving the adhesiveness of the coated metal sheet and the corrosion resistance. Chemical conversion is one type of pre-coating treatment for metal sheets, and a chemical conversion film is a composition layer formed by the pre-coating treatment. The metal sheets are preferred in that the sheets have been subjected to non-chromate anti-rust treatment from the viewpoint of reducing environmental loads in production and use of the coated metal sheet, and in that the sheets have been subjected to chromate anti-rust treatment from the viewpoint of further improving the corrosion resistance.

Examples of the chemical conversion film by the non-chromate anti-rust treatment include Ti—Mo composite films, fluoro acid-based films, phosphate films, resin-based films, resin and silane-coupling-agent-based films, silica-based films, silica and silane-coupling-agent-based films, zirconium-based films, and zirconium and silane-coupling-agent-based films.

From the above-described viewpoint, the amount of the Ti—Mo composite film deposited is preferably 10 to 500 $mg/m^2$ in terms of total Ti and Mo, the amount of the fluoro acid film deposited is preferably 3 to 100 $mg/m^2$ in terms of fluorine or in terms of total elemental metals, and the amount of the phosphate film deposited is preferably 0.1 to 5 $g/m^2$ in terms of elemental phosphorous, in the metal sheet.

The amount of the resin-based film deposited is preferably 1 to 500 $mg/m^2$ in terms of the resin, the amount of the resin and silane coupling agent-based film deposited is preferably 0.1 to 50 $mg/m^2$ in terms of Si, the amount of the silica-based film deposited is preferably 0.1 to 200 $mg/m^2$ in terms of Si, the amount of the silica and silane coupling agent-based film deposited is preferably 0.1 to 200 $mg/m^2$ in terms of Si, the amount of the zirconium-based film deposited is preferably 0.1 to 100 $mg/m^2$ in terms of Zr, and the amount of the zirconium and silane coupling agent-based film deposited is preferably is 0.1 to 100 $mg/m^2$ in terms of Zr.

Also, examples of the chromate anti-rust treatment include coating-type chromate treatment and phosphate-chromate-based treatment. From the above-described viewpoint, the amount of the film deposited by the chromate anti-rust treatment in the metal sheet is preferably from 20 to 80 $g/m^2$ in terms of element chromium.

The overcoat coating film is usually composed of resin other than fluorine resin. The resin is selected as appropriate from the viewpoint of designability, weather resistance and the like. Examples of the resin include polyester, acrylic resins, and urethane resins.

The film thickness T of the overcoat coating film is from 3 to 20 μm. An extremely large film thickness T of the overcoat coating film may be responsible for occurrence of defective coating (foaming), reduction in the productivity, increase in the production cost and the like, whereas, with an extremely small film thickness T, the intended designability and the intended flat portion-corrosion resistance may not be achieved. For example, in order to obtain a coated metal sheet that has good productivity, exhibits the intended gloss and coloring, and can be actually used as an exterior building material for at least 10 years, the film thickness T of the overcoat coating film is, for example, preferably 9 μm or more, more preferably 10 μm or more, still more preferably 11 μm or more, from the above-described viewpoint. Also due to the above-described reason, the film thickness T of the overcoat coating film is preferably 19 μm or less, more preferably 17 μm or less, still more preferably 15 μm or less. The film thickness T of the overcoat coating film is, for example, the average value of distances from the bottom to the surface at a plurality of positions of the overcoat coating film Alternatively, when the coated metal sheet has other coated film(s) other than the overcoat coating film, the film thickness T of the overcoat coating film can be determined in further consideration of the other coated film(s). For example, when the coated metal sheet has an undercoat coating film described below and the overcoat coating film, the film thickness T of the overcoat coating film is preferably from 9 to 20 μm from the viewpoint of the designability, corrosion resistance, and processability. Alternatively, when the coated metal sheet has the undercoat coating film, an intercoat coating film described below, and the overcoat coating film, the film thickness T of the overcoat coating film is preferably from 3 to 15 μm, from the above-described viewpoint.

The film thickness T of the overcoat coating film is, from the viewpoint of the designability of the coated metal sheet, preferably larger when a color of the overcoat coating film is light, and can be smaller when the color of the overcoat coating film is dark. Although it depends on the case, for example, when the value L of the overcoat coating film is 70 or less, the film thickness T of the overcoat coating film can be 13 μm or less, and when the value L of the overcoat coating film is more than 80, the film thickness is preferably 15 μm or more.

Alternatively, the film thickness T of the overcoat coating film can be smaller, as the color of the overcoat coating film is closer to the color of the surface of the steel sheet before the overcoat coating film is formed (for example, an undercoat coating film described below), from the viewpoint of the designability of the coated metal sheet. Although it depends on the case, for example, when the absolute value ΔL of the difference between the value L of the overcoat coating film and the value L of the color of the surface of the steel sheet before the coating film is formed is 10 or less, the film thickness T of the overcoat coating film can be 11 μm or less, when ΔL is 20 or less, the film thickness T can be 13 μm or less, and when ΔL is 50 or less, the film thickness T can be 15 μm or less.

The value L can be determined by calculation by the Hunter's color difference formula from the measurement result by a commercially available spectrophotometer (for example, manufactured by KONICA MINOLTA OPTICS, INC. "CM3700d").

The overcoat coating film contains a gloss adjusting agent. The gloss adjusting agent is blended in the overcoat coating film to moderately roughen the surface of the overcoat coating film for the purpose to achieve the intended gloss in the coated metal sheet, for the purpose to adjust variation of gloss among production lots and the like, imparting the intended appearance with gloss to the coated metal sheet.

The gloss adjusting agent has a number average particle diameter R of 1.0 μm or more. When the gloss adjusting agent is extremely small, the gloss of the overcoat coating film is extremely high, and thus, the intended designability may not be achieved. As such, it is possible to determine the number average particle diameter R of the gloss adjusting agent as appropriate depending on the intended designability (glossiness) of the coated metal sheet as far as R satisfies the equation described below. However, when R is extremely large, the gloss of the overcoat coating film is extremely low, and thus the intended designability cannot be achieved. For example, from the viewpoint of obtaining a coated metal sheet having a glossiness at 60° of 20 to 85 in addition to flat-portion corrosion resistance, the number average particle diameter R of the gloss adjusting agent is preferably 2.0 μm or more, more preferably 3.0 μm or more, still more preferably 5.0 μm or more, even more preferably 7.0 μm or more. The number average particle diameter can be confirmed by observation of the cross-section of the overcoat coating film or can be measured by an image analyzing method and the Coulter method (for example, using an accurate particle sizing and counting analyzer "Multisizer 4" manufactured by Beckman Coulter Inc.).

Alternatively, when the coated metal sheet has other coated film(s) other than the overcoat coating film, the number average particle diameter R of the gloss adjusting agent can be determined depending on the film thickness T of the overcoat coating film. For example, when the coated metal sheet has an undercoat coating film and an overcoat coating film, the number average particle diameter R of the gloss adjusting agent is preferably 2.0 μm or more, from the viewpoint of the designability by the intended gloss, corrosion resistance, and processability. Alternatively, when the coated metal sheet has the undercoat coating film, an intercoat coating film described below, and the overcoat coating film, the number average particle diameter R of the gloss adjusting agent is preferably 1.0 μm or more, from the above-described viewpoint.

The content of the gloss adjusting agent in the overcoat coating film is 0.01 to 15 vol %. When the content is extremely high, the gloss of the overcoat coating film becomes extremely low, and also, the processed-part adhesiveness decreases. When the content is extremely low, the gloss may not be controlled. Thus, even if the content is extremely large or small, the intended designability may not be achieved. For example, in order to obtain a coated metal sheet having a glossiness at 60° of 20 to 85, the content of the gloss adjusting agent in the overcoat coating film is preferably 0.05 vol % or more, more preferably 0.1 vol % or more. Also from the above-described reason, the content of the gloss adjusting agent in the overcoat coating film is preferably 13 vol % or less, more preferably 10 vol % or less. The content can be confirmed by measurement of the ash content in the overcoat coating film, collection of the gloss adjusting agent by dissolution of the overcoat coating film, image analysis of a cross-sectional image of element discrimination conducted at a plurality of points or the like.

The gloss adjusting agent is particles having micropores (hereinafter, may be referred to as "microporous particles"). Examples of the microporous particles include aggregates formed by chemical bonding of primary particles, agglomerates formed by physical bonding of primary particles, and porous particles. The porous particles have a porous structure at least inside the particles. The gloss adjusting agent may be composed solely of the microporous particles or may contain particles other than microporous particles. The microporous particles may be inorganic particles or organic particles, and can be selected from known microporous particles used as a gloss adjusting agent, as far as the particles satisfy the equation described below. Examples of the materials of the microporous particles include silica, calcium carbonate, barium sulfate, polyacrylonitrile, and calcium carbonate-calcium phosphate composites. The gloss adjusting agent is preferably silica particles from the viewpoint of having a high function of adjusting the gloss of coated metal sheets.

The coated metal sheet satisfies the following equation:

$$D_{97.5}/T \leq 0.7$$

wherein R is the number average particle diameter of the gloss adjusting agent (μm), T is the film thickness of the overcoat coating film (μm), and $D_{97.5}$ is the 97.5% particle diameter (μm) in the accumulated particle size distribution of the gloss adjusting agent based on the number of particles (hereinafter, may also be referred to as "number particle size distribution"). However, when the upper particle size of the number particle size distribution of the gloss adjusting agent is set to Ru (μm), the corresponding Ru is 1.2T or less. "Upper limit particle diameter (Ru)" is a particle diameter when the particle size distribution curve in the number particle size distribution meets the baseline at the number average particle diameter R or more.

$D_{97.5}$ will be a substantial index of the particle diameter of the gloss adjusting agent by which the effect of the present invention is achieved. With extremely large $D_{97.5}/T$, the microporous particles may be exposed due to wearing of the overcoat coating film during actual use, and the intended flat portion-corrosion resistance may not be achieved. With extremely small $D_{97.5}/T$, the intended glossiness may not be achieved.

For example, from the viewpoint of obtaining a coated metal sheet having a glossiness at 60° of 20 to 85, $D_{97.5}/T$ is preferably 0.3 or more, more preferably 0.4 or more. Additionally, from the viewpoint of obtaining a coated metal sheet having an actual age of service as an exterior building material of at least 10 years or more, $D_{97.5}/T$ is preferably 0.6 or less, more preferably 0.5 or less.

Meanwhile, in the corresponding number particle size distribution, the content of the particles larger than $D_{97.5}$ is only about 2.5% based on the number of all the particles. Thus, a gloss adjusting agent of which particle size distribution curve exhibits specific sharpness at a particle diameter of the number average particle diameter R or more in the number particle size distribution, satisfying "$D_{97.5}/T \leq 0.7$", can be applied as it is to the present invention. In other words, the gloss adjusting agent having a meeting point (Ru) of 1.2T or less, at which the particle size distribution curve in the number particle size distribution meets the baseline of the number particle size distribution at the number average particle diameter R or more, which satisfies "$D_{97.5}/T \leq 0.7$", can be applied to the present invention.

The reason why sufficient flat portion-corrosion resistance is exhibited even when the upper limit particle diameter Ru (μm) is 1.2T or less (even when more than 0.7T) can be assumed as follows. First, in the overcoat coating film, the resin composition of the overcoat coating film is superposed on the gloss adjusting agent, and thus, it is conceivable that a gloss adjusting agent having a particle diameter of 1.2T or less normally may not be exposed from the surface of the overcoat coating film. Alternatively, particles having a particle diameter larger than 0.7T in the gloss adjusting agent are unlikely to deviate from the normal distribution so significantly, even if the actual number particle size distribution described above in the range larger than the R deviates from the normal distribution. Thus, it is conceivable that the content of the particles will be less than 2.5% at most based on the total. Therefore, it is conceivable that particles having a particle diameter larger than 0.7T in the gloss adjusting agent may be too small in number to substantially influence the flat portion-corrosion resistance. Moreover, the gloss adjusting agent is oddly shaped in general, and usually flattened to some extent. Conceivably, in the gloss adjusting agent in the overcoat coating film, usually the longitudinal direction of the gloss adjusting agent tends to be oriented to the horizontal direction more than the vertical direction due to the application of the overcoat coating material described below, and thus, the particle diameter in the in film-thickness direction in the gloss adjusting agent in the overcoat coating film usually becomes shorter than the long diameter of the gloss adjusting agent (for example, 1.2T).

When the Ru is extremely large, the microporous particles are exposed due to wearing of the overcoat coating film during actual use, and the intended flat portion-corrosion resistance may not be obtained. From the viewpoint of obtaining a coated metal sheet having an actual age of service as an exterior building material of at least 10 years or more, Ru is preferably less than T, more preferably 0.7T or less, still more preferably 0.6T or less. R, $D_{97.5}$, and Ru can be determined from the number particle size distribution of the gloss adjusting agent.

Note that, the side smaller than the average particle diameter R in the number particle size distribution of the gloss adjusting agent may be in any mode as long as the conditions of the particle size distribution are satisfied.

As the gloss adjusting agent that satisfies the conditions according to the particle size distribution, commercially-available products and their classified materials can be used.

Note that, to produce above-described coated metal sheet, the gloss adjusting agent may not satisfy the particle size conditions aforementioned (for example, coarse particles larger than 1.2T are present and the like), or may deviate from the conditions in the process of production. In this case, a step of pulverizing the coarse particles in the overcoat coating material described below, such as roller mill treatment as described below, is suitably performed from the viewpoint of obtaining the coated metal sheet.

The overcoat coating film may further contain other ingredients besides the resin and gloss adjusting agent aforementioned, as far as the effect of the present embodiment can be achieved. For example, the overcoat coating film may further contain a colorant. Examples of the colorant include inorganic pigments such as titanium oxide, calcium carbonate, carbon black, iron black, iron oxide yellow, titanium yellow, colcothar, iron blue, cobalt blue, cerulean blue, ultramarine blue, cobalt green, molybdenum red and the like; composite oxide calcined pigments containing metal components such as CoAl, CoCrAl, CoCrZnMgAl, CoNiZnTi, CoCrZnTi, NiSbTi, CrSbTi, FeCrZnNi, MnSbTi, FeCr, FeCrNi, FeNi, FeCrNiMn, CoCr, Mn, Co, SnZnTi and the like; metallic pigments such as Al flakes, resin-coated Al flakes, Ni flakes, stainless flakes and the like; and organic pigments such as Quinacridone Red, Lithol Red B, Brilliant Scarlet G, Pigment Scarlet 3B, Brilliant Carmine 6B, Lake Red C, Lake Red D, Permanent Red 4R, Bordeaux 10B, Fast Yellow G, Fast Yellow 10G, Pare Red, Watching Red, Benzidine Yellow, Benzidine Orange, Bon Maroon L, Bon Maroon M, Brilliant Fast Scarlet, Vermilion Red, Phthalocyanine Blue, Phthalocyanine Green, Fast Skyblue, Aniline Black and the like. The colorant is sufficiently smaller relative to the gloss adjusting agent, and, for example, the number average particle diameter of the colorant is 0.01 to 1.5 µm. The content of the colorant in the overcoat coating film is, for example, 2 to 20 vol %.

The overcoat coating film may further contain an extender pigment. Examples of the extender pigment include barium sulfate, titanium oxide and the like. The extender pigment is sufficiently smaller relative to the gloss adjusting agent, and, for example, the number average particle diameter of the extender pigment is 0.01 to 1 µm. The content of the extender pigment in the overcoat coating film is, for example, 0.1 to 15 vol %.

The overcoat coating film may further contain a lubricant, from the viewpoint of preventing the occurrence of galling in the overcoat coating film on processing the coated metal sheet. Example of the lubricant include organic waxes such as fluorine-based wax, polyethylene-based wax, styrene-based wax, polypropylene-based wax and the like, and inorganic lubricants such as molybdenum disulfide, talc and the like. The content of the lubricant in the overcoat coating film is, for example, 0 to 10 vol %.

The overcoat coating film is produced by a known method that includes applying a coating material for overcoat coating films to the surface of the metal sheet, the surface of the undercoat coating film described below or the like, drying the coating material, and curing the coating material as required. The coating material for overcoat coating films contains materials for the overcoat coating film aforementioned, and may further contain other ingredients besides the materials as far as the effect of the present embodiment can be achieved.

For example, the coating material for overcoat coating films may further contain a curing agent. The curing agent crosslinks the polyester or acrylic resin aforementioned on curing (baking) when the overcoat coating film is produced. The type of the curing agent can be selected from the crosslinking agent aforementioned and known curing agents as appropriate, depending on the type of the resin to be used, baking conditions and the like.

Examples of the curing agent include melamine compounds, isocyanate compounds, combinations of a melamine compound and an isocyanate compound and the like. Examples of the melamine compound include imino group-type, methylol-imino group-type, methylol group-type, or complete alkyl group-type melamine compounds. The isocyanate compound may be any of aromatic, aliphatic, and alicyclic compounds, and examples include m-xylene diisocyanate, hexamethylene diisocyanate, naphthalene diisocyanate, isophorone diisocyanate, and block compounds of these.

The overcoat coating film may further contain a curing catalyst as appropriate so far as the storage stability of the coating material for overcoat coating films is not affected. The content of the curing agent in the overcoat coating film is for example, 10 to 30 vol %.

The overcoat coating film may also contain 10 vol % or less of an ultraviolet absorber (UVA) and a light stabilizer (HALS) as appropriate in order to further improve the weather resistance. Furthermore, the overcoat coating film may contain a hydrophilizing agent, for example, 30 vol % or less of a partially hydrolyzed condensate of tetraalkoxysilane for prevention of rain streak stains.

The coated metal sheet may have further components as far as the effect of the present embodiment can be exerted. For example, the coated metal sheet preferably further has an undercoat coating film between the metal sheet and the overcoat coating film, from the viewpoint of improving the adhesiveness and the corrosion resistance of the overcoat coating film in the coated metal sheet. The undercoat coating film is disposed on the surface of the metal sheet, or, when the chemical conversion film has been made, on the surface of the chemical conversion film.

The undercoat coating film is composed of resin. Examples of the resin include epoxy resin, polyester, epoxy-modified polyester resin, acrylic resin, and phenoxy resin.

The undercoat coating film may further contain an anti-rust pigment, a coloring pigment, a metallic pigment or the like. Examples of the anti-rust pigment include non-chromium-based anti-rust pigments such as modified silica, vanadates, magnesium hydrogenphosphate, magnesium phosphate, zinc phosphate, aluminum polyphosphate and the like, and chromium-based anti-rust pigments such as strontium chromate, zinc chromate, barium chromate, calcium chromate and the like. Example of the coloring pigment include titanium oxide, carbon black, chromium oxide, iron oxide, colcothar, titanium yellow, cobalt blue, cobalt green, Aniline Black, and Phthalocyanine Blue. Example of the metallic pigment include aluminum flakes (non-leafing type), bronze flakes, copper flakes, stainless steel flakes, and nickel flakes. Examples of the extender pigment include barium sulfate, titanium oxide, silica, and calcium carbonate.

The content of the pigment in the undercoat coating film can be determined as appropriate, as far as the effect of the present embodiment can be achieved. For example, the content of the anti-rust pigment in the undercoat coating film is preferably, for example, 10 to 70 vol %.

Also, the coated metal sheet further may have an intercoat coating film between the undercoat coating film and the overcoat coating film, from the viewpoint of improving the adhesiveness and the corrosion resistance of the overcoat coating film in the coated metal sheet.

The intercoat coating film is composed of resin. Examples of the resin include fluorine resin such as polyvinylidene fluoride and the like, polyester, polyester-modified silicones, acrylic resin, polyurethane, and polyvinyl chloride. The intercoat coating film also may further contain additives such as an anti-rust pigment, a coloring pigment, a metallic pigment, or the like, similarly as the undercoat coating film, in the range where the effect of the present embodiment can be achieved.

Figure 7A:
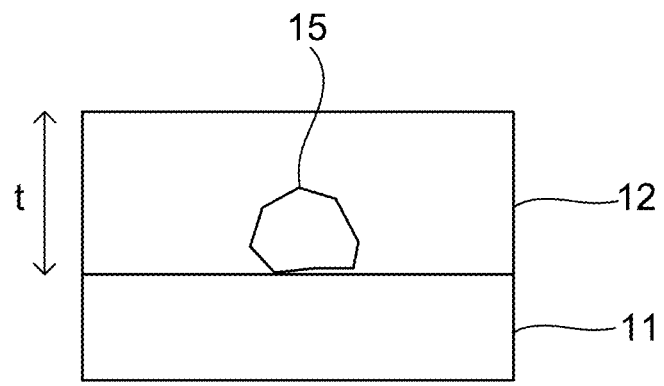
FIG. 7A is a schematic diagram illustrating a cross section of the coated metal sheet immediately after a coating material for overcoat coating films was applied to the sheet.
Figure 7B:
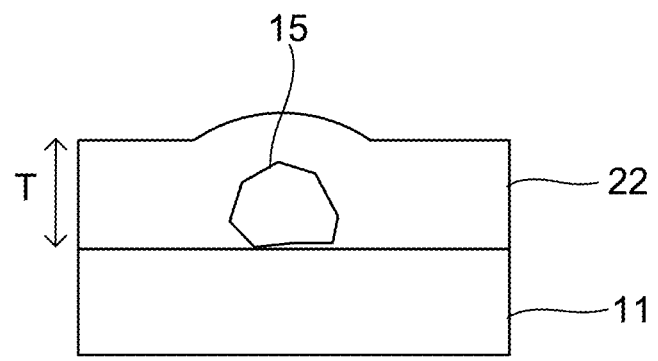
FIG. 7B is a schematic diagram illustrating the cross section of the coated metal sheet after the coating material was baked onto the sheet.

FIG. 7A is a schematic diagram illustrating a cross section of the coated metal sheet immediately after a coating material for overcoat coating films was applied to the sheet, and FIG. 7B is a schematic diagram illustrating the cross section of the coated metal sheet after the coating material was baked onto the sheet. As shown in FIGS. 7A and 7B, under a condition where a coating material for overcoat coating films is applied to a base steel sheet 11 (for example, a plated steel sheet or a plated steel sheet and an undercoat coating film), gloss adjusting agent 15 does not substantially affect the surface state of coating film 12 of the coating material. Thus, the intended gloss is not usually exhibited before baking of the coating material. Meanwhile, after baking of the coating material, the volatile components in the coating material are volatilized, and the film thickness T of overcoat coating film 22 becomes smaller than the thickness t of coating film 12. Thus, a protrusion by gloss adjusting agent 15 is formed on the surface of overcoat coating film 22, and overcoat coating film 22 exhibits the intended gloss (enamel-like gloss in the present invention).

The coated metal sheet according to the present embodiment is a chromate-free or chromate-based coated metal sheet. "Chromate-free" means that the coated metal sheet contains substantially no hexavalent chromium. It is possible to confirm that the coated metal sheet is "chromate-free" as follows. For example, in any of the metal sheet, the chemical conversion film, the undercoat coating film, and the overcoat coating film aforementioned, four 50 mm×50 mm specimens are cut off from a metal sheet on which the overcoat coating film or the undercoat coating film has been produced singly, and the specimens are immersed in 100 mL of boiling pure water for 10 minutes. Then, when hexavalent chromium eluted in pure water is quantified by a concentration analysis method in compliance with JIS H8625, Annex 2. 4. 1, "Diphenylcarbazide Visual Colorimetric Method", the concentration shall be lower than the detection limit. Hexavalent chromium is not eluted form the coated metal sheet during actual use into the environment, and the coated metal sheet exhibits sufficient corrosion resistance at its flat portion. A "flat portion" refers to a portion that is covered with the overcoat coating film of the metal sheet and has not been deformed by bending, drawing, bulging, embossing, roll-forming or the like.

The coated metal sheet is suitable for a coated metal sheet having an enamel gloss. The enamel gloss refers to a glossiness at 60° being from 20 to 85. When the glossiness is extremely low, a matte appearance become predominant, and an enamel-like gloss may not be achieved. When the glossiness is extremely high, the glossiness cannot be controlled, and the reproducibility of the coating appearance cannot be obtained. The glossiness is adjusted with the average particle diameter of the gloss adjusting agent, its content in the overcoat coating film, and the like.

The coated metal sheet does not contain particles having a particle diameter larger than that of the gloss adjusting agent (large particles), such as a matting agent, which is blended for a purpose different from that of the gloss adjusting agent. This is preferred from the viewpoint of attaining the intended designability, such as the enamel gloss. However, the coated metal sheet may contain the large particles, as far as the effect of the present embodiment can be achieved. The large particles are preferably primary particles, from the viewpoint of maintaining flat portion-corrosion resistance.

The method for producing the coated metal sheet include a first step of applying an overcoat coating material that contains the resin and the gloss adjusting agent onto the metal sheet and a second step of curing the coating film of the overcoat coating material to form the overcoat coating film.

In the first step, the overcoat coating material may be applied directly onto the surface of the metal sheet, may be applied onto the chemical conversion film formed on the surface of the metal sheet, or may be applied onto the undercoat coating film formed on the surface of the coated metal sheet or the surface of the chemical conversion film.

The overcoat coating material is prepared by, for example, dispersing the materials for the overcoat coating film aforementioned in a solvent. The coating material may contain a solvent, a crosslinking agent and the like. Examples of the solvent include hydrocarbons such as toluene, xylene and the like; esters such as ethyl acetate, butyl acetate and the like; ethers such as cellosolve and the like; and ketones such as methyl isobutyl ketone, methyl ethyl ketone, isophorone, cyclohexanone and the like.

The overcoat coating material is applied, for example, by a known method such as roll coating, curtain flow coating, spray coating, immersion coating and the like. The amount of the overcoat coating material coated is adjusted as appropriate, depending on the intended film thickness T of the overcoat coating film.

The gloss adjusting agent contained in the overcoat coating material satisfies the aforementioned size conditions. In the overcoat coating material, when the gloss adjusting agent does not satisfy the aforementioned size conditions, the overcoat coating material that satisfies the conditions can be obtained by subjecting the overcoat coating material to treatment for pulverizing the particles in the overcoat coating material. Examples of the "treatment for pulverizing the particles" include roller mill treatment. More specifically, by appropriately setting the clearance between the rollers of the roller mill and treatment time such that the Ru falls below 1.2T, the overcoat coating material that satisfies the conditions can be obtained.

The second step can be conducted, for example, by a known method for baking the overcoat coating material onto a metal sheet. For example, in the second step, a metal sheet to which a coating material for overcoat coating films has been applied is heated such that the temperature of the metal sheet reaches 200 to 250° C.

The production method of the coated metal sheet may include other steps other than the first step and second step aforementioned, as far as the effect of the present invention can be achieved. Examples of the other steps include a step for forming a chemical conversion film, a step for forming an undercoat coating film, and a step for forming an intercoat coating film.

The chemical conversion film can be formed by applying an aqueous chemical conversion liquid for forming the film by a known method such as roll-coating, spin-coating, spraying methods and the like, to the metal sheet surface and drying the metal sheet after application without water washing. The drying temperature and the drying time for the metal sheet are preferably 60 to 150° C. as the temperature which the metal sheet reaches and 2 to 10 seconds, for example, from the viewpoint of productivity.

The undercoat coating film is produced by application of a coating material for undercoat coating films. The coating material may contain a solvent, a crosslinking agent and the like. Examples of the solvent include hydrocarbons such as toluene xylene and the like; esters such as ethyl acetate, butyl acetate and the like; ethers such as cellosolve and the like; and ketones such as methyl isobutyl ketone, methyl ethyl ketone, isophorone, cyclohexanone and the like. Examples of the crosslinking agent include melamine resin, isocyanate resin and the like for crosslinking the resin aforementioned. The coating material for undercoat coating films is prepared by homogeneously mixing and dispersing the materials aforementioned.

The coating material for undercoat coating films is applied by a known method such as roll coating, curtain flow coating, spray coating, immersion coating or the like to a metal sheet in an amount to be coated such that a dry film thickness of 1 to 10 μm, preferably 3 to 7 μm is obtained. A coating film of the coating material is produced by heating a metal sheet at, for example, 180 to 240° C., a temperature which the metal sheet achieves, thereby baking the film onto the metal sheet.

The intercoat coating film is also produced by application of a coating material for intercoat coating films, similarly as the undercoat coating film. The coating material may contain the solvent, the crosslinking agent and the like in addition to the materials for the intercoat coating film. The coating material for intercoat coating films is prepared by homogeneously mixing and dispersing the materials aforementioned. The coating material for intercoat coating films is preferably applied, for example, by the above-described known method, to the undercoat coating film in an amount to be coated such that the sum of the dry film thickness of the coating material and the film thickness of the undercoat coating film reaches 3 to 20 μm (preferably 5 to 15 μm), from the viewpoint of the processability. A coating film of the coating material is produced by heating a metal sheet at, for example, 180 to 240° C., a temperature which the metal sheet achieves, thereby baking the film onto the metal sheet.

Applications of the coated metal sheet are suitable for exterior use. "For exterior use" refers to being used in portions exposed to the open air such as roofs, walls, accessories, signboards, outdoor-installed apparatuses and the like, wherein the portions may be irradiated with a sunbeam and its reflected light. Examples of the coated metal sheet for exterior use include coated metal sheets for exterior building materials and the like.

The coated metal sheet is formed into an exterior building material by known processing such as bending, drawing, bulging, embossing, roll-forming or the like. In this manner, the exterior building material is composed of the coated metal sheet. The exterior building material may further include other structure as far as the above-described effects can be achieved. For example, the exterior building material may further have a structure to be subjected to appropriate installation during actual use of the exterior building material. Examples of such a structure include members to fix an exterior building material to a building, members to connect a plurality of exterior building materials, marks that show the direction of an exterior building material on mounting, foam sheets and foam layers to improve the thermal insulation properties and the like. These structures may be included in the coated metal sheet for exterior use aforementioned.

In the coated metal sheet, the gloss adjusting agent (microporous particles) is sufficiently confined in the overcoat coating film. Additionally, the particle diameter of the gloss adjusting agent in the overcoat coating film in the film thickness direction of the overcoat coating film is likely to become sufficiently small as its particle shape is lower-profile. Furthermore, about 97.5% by number, that is, the most portion of the gloss adjusting agent has a sufficiently small particle diameter of 0.7T or less relative to the film thickness T of the overcoat coating film. Thus, the overcoat coating film can be designed such that the microporous particles are not exposed within the intended age of service, even if the resin in the overcoat coating film is gradually worn from the surface of the overcoat coating film by actual use in an exterior application.

Therefore, cracking and collapse of the microporous particles and fall-off from the overcoat coating film within the intended age of service are prevented, and corrosive factors such as rainwater and the like cannot reach the metal sheet during the intended age of service. Thus, the coated metal sheet, if being chromate-free (if the metal sheet has been non-chromate anti-rust treated), exhibits flat portion-corrosion resistance at least equivalent to that of conventional chromate-treated coated metal sheets, and if having been subjected to chromate treatment, exhibits flat portion-corrosion resistance equivalent to or greater than that of conventional chromate-treated coated metal sheets. Examples of the "chromate treatment" of the coated metal sheet in the embodiment include, in addition to the chromate anti-rust treatment of the metal sheet, the adoption of an undercoat coating film containing a chromate-based anti-rust pigment. Examples of the "coated metal sheet subjected to chromate treatment" include coated metal sheets that have a non-chromate anti-rust treated metal sheet and an undercoat coating film containing a chromate-based anti-rust pigment, coated metal sheets that has a chromate anti-rust treated metal sheet and an undercoat coating film containing no chromate-based anti-rust pigment, and coated metal sheet that have a chromate anti-rust treated metal sheet and an undercoat coating film containing a chromate-based anti-rust pigment.

As clear from the above description, according to the present embodiment, there can be provided a coated metal sheet which, although being chromate-free, has sufficient flat-portion corrosion resistance, wherein the coated metal sheet has a metal sheet and an overcoat coating film to be disposed on/above the metal sheet, wherein the overcoat coating film contains particles having micropores (microporous particles) as a gloss adjusting agent, wherein the content of the gloss adjusting agent in the overcoat coating film is from 0.01 to 15 vol %, and wherein the following expressions are satisfied:

$D_{97.5}/T \leq 0.7$ $Ru \leq 1.2T$ $R \geq 1.0$ $3 \leq T \leq 20$ wherein R (μm) is the number average particle diameter of the gloss adjusting agent, T (μm) is the film thickness of the overcoat coating film, $D_{97.5}$ (μm) is the 97.5% particle diameter in the number particle size distribution of the gloss adjusting agent, and Ru (μm) is the upper limit particle diameter in the number particle size distribution of the gloss adjusting agent.

Additionally, the fact that the R is 2.0 or more and the T is 9 or more and 19 or less is more effective, from the viewpoint of the designability, corrosion resistance, and processability of the coated metal sheet in the case of a two-coat coated metal sheet comprising the overcoat coating film and the undercoat coating film.

The fact that the Ru is less than T is more effective, from the viewpoint of further improvement of the flat portion-corrosion resistance of the coated metal sheet, or from the viewpoint of further prolongation of the life of the coated metal sheet having sufficient flat portion-corrosion resistance.

Additionally, the fact that the metal sheet has been subjected to non-chromate anti-rust treatment and the coated metal sheet is chromate-free is more effective, from the viewpoint of reducing environmental loads in use or production of the coated metal sheet, and the fact that the metal sheet has been subjected to chromate anti-rust treatment is more effective, from the viewpoint of further improvement of the flat portion-corrosion resistance of the coated metal sheet.

Also, the fact that the gloss adjusting agent is silica particles is more effective, from the viewpoint of inexpensively producing coated metal sheets having the intended designability.

Also, the fact that the coated metal sheet further has an undercoat coating film between the metal sheet and the overcoat coating film is more effective from the viewpoint of improving the adhesiveness and corrosion resistance of the overcoat coating film in the coated metal sheet, and the fact that the coated metal sheet further has an intercoat coating film between the undercoat coating film and the overcoat coating film is more effective, from the above-described viewpoint.

Also, when the coated metal sheet has a glossiness at 60° of 20 to 85, both the intended designability and sufficient flat portion-corrosion resistance may be achieved.

Additionally, the fact that the coated metal sheet is a coated metal sheet for exterior use is further effective from the viewpoint of reducing a load on the environment due to elution of chromium during actual use.

An exterior building material composed of the coated metal sheet is chromate-free as well as can exhibit excellent flat portion-corrosion resistance during actual use of 10 years or more.

Additionally, the aforementioned method for producing a coated metal sheet having the metal sheet and the overcoat coating film to be disposed on the metal sheet comprises a step of applying an overcoat coating material containing a resin and a gloss adjusting agent onto the metal sheet and a step of curing the coating film of the overcoat coating material to form the overcoat coating film, wherein the content of the gloss adjusting agent in the overcoat coating film is from 0.01 to 15 vol %, wherein the gloss adjusting agent is particles having micropores, and wherein the gloss adjusting agent which satisfies the following expressions is employed:

$D_{97.5}/T \leq 0.7$ $Ru \leq 1.2T$ $R \geq 1.0$ $3 \leq T \leq 20$ wherein R (μm) is the number average particle diameter of the gloss adjusting agent, T (μm) is the film thickness of the overcoat coating film, $D_{97.5}$ (μm) is the 97.5% particle diameter in the number particle size distribution of the gloss adjusting agent, and Ru (μm) is the upper limit particle diameter in the number particle size distribution of the gloss adjusting agent. Accordingly, it is possible to provide a coated metal sheet which, although being chromate-free, has excellent flat-portion corrosion resistance equivalent to or greater than that of coated metal sheets comprising a chromate anti-rust treated coated metal sheet.

In the production method, when the overcoat coating material has been subjected to treatment for pulverizing the particles in the overcoat coating material, coarse particles present accidentally and irregularly in the overcoat coating film are substantially removed from the overcoat coating material. Thus, the treatment is more effective, from the viewpoint of further improvement of the flat portion-corrosion resistance of the coated metal sheet.

Hereinafter, the present invention will be described in more detail with reference to Examples, but the present invention is not limited by these Examples.

Examples

[Production of Coated Base Sheets 1 to 5]

A hot-dip 55% Al—Zn alloy-plated steel sheet having an amount deposited on both the sides of 150 g/m² was alkali-degreased (base sheet 1). Subsequently, a non-chromate anti-rust treatment solution described below at 20° C. was applied to the surface of the plated layer of the plated steel sheet, as pre-coating treatment. The plated steel sheet was dried at 100° C. without washing with water to thereby obtain a non-chromate anti-rust treated plated steel sheet having an amount of deposited of 10 mg/m² in terms of Ti (base sheet 2).

(Non-Chromate Anti-Rust Treatment Solution)

| | |
|---|---|
| Hexafluorotitanate | 55 g/L |
| Hexafluorozirconate | 10 g/L |
| Aminomethyl-substituted polyvinyl phenol | 72 g/L |
| Water | Balance |

Additionally, to a surface of base sheet 2, the following undercoat coating material containing epoxy resin was applied. The chemical conversion steel sheet was heated such that the temperature of the plated steel sheet reached 200° C. to thereby obtain the chromate-free plated steel sheet including an undercoat coating film having a dry film thickness of 5 μm (base sheet 3).

| Phosphate mixture | 15 vol % |
|---|---|
| Barium sulfate | 5 vol % |
| Silica | 1 vol % |
| Clear coating material | Balance |

Alternatively "SURFCOAT NRC300NS" manufactured by Nippon Paint Co., Ltd. ("SURFCOAT" is a registered trademark of the company), which is a chromate treatment solution, was used instead of the chromate-free treatment solution to conduct chromate anti-rust treatment of an amount deposited of 20 mg/m² in terms of chromium. Subsequently, to the surface of the chromate anti-rust treated plated steel sheet, the following undercoat coating material containing epoxy resin was applied. The chemical conversion steel sheet was heated such that the temperature of the plated steel sheet reached 200° C. to thereby obtain a plated steel sheet including a chromate-based undercoat coating film having a dry film thickness of 5 μm (base sheet 4).

| Strontium chromate | 15 vol % |
|---|---|
| Barium sulfate | 5 vol % |
| Silica | 1 vol % |
| Clear coating material | Balance |

In the undercoat coating material, the clear coating material is "NSC680" manufactured by Nippon Fine Coatings Co., Ltd. In the undercoat coating material, the phosphate mixture is a mixture of magnesium hydrogenphosphate, magnesium phosphate, zinc phosphate, and aluminum tripolyphosphate. Also, the silica is a extender pigment and has an average particle diameter of 5 μm. Additionally, the vol % is a proportion relative to the solid content in the undercoat coating material.

Alternatively, to a surface of base sheet 3, the following intercoat coating material containing polyester was applied. The chemical conversion steel sheet was heated such that the temperature of the plated steel sheet reached 220° C. to thereby obtain the chromate-free plated steel sheet including an intercoat coating film having a dry film thickness of 5 μm on the undercoat coating film (base sheet 5).

| Carbon black | 7 vol % |
|---|---|
| Silica particles 1 | 1 vol % |
| Polyester-based coating material | Balance |

The polyester-based coating material is "CA clear coating material" manufactured by Nippon Fine Coatings Co., Ltd., which is a polyester-based coating material (PE). Carbon black is a coloring pigment. The vol % described above is a proportion relative to the solid content in the intercoat coating material.

Also, silica particles 1 described above (silica 1) are a classified material or its mixture, for example, and have a particle size distribution like the normal distribution. The number average particle diameter R of the silica particles 1 is 5.0 μm, and $D_{97.5}$ in the number particle size distribution is 7.6 μm. Additionally, the upper limit particle diameter Ru in the number particle size distribution is 9.5 μm.

The following ingredients were mixed in the following amounts to thereby obtain an overcoat coating material.

| Carbon black | 7 vol % |
|---|---|
| Silica particles 1 | 1 vol % |
| Clear coating material 1 | Balance |

The clear coating material 1 described above is "CA clear coating material" manufactured by Nippon Fine Coatings Co., Ltd., which is a polyester-based coating material (PE). Carbon black is a coloring pigment. The vol % described below is a proportion relative to the solid content in the overcoat coating material.

[Production of Coated Metal Sheet 1]

The overcoat coating material was applied to the surface of the undercoat coating film of base sheet 3. Base sheet 3 was heated such that the temperature of the plated steel sheet in base sheet 3 reached 220° C. to thereby produce an overcoat coating film having a dry film thickness T of 11 μm. Coated metal sheet 1 was thus produced.

Coated metal sheet 1 was cut to allow its cross section to be exposed. The cross section was encapsulated inside a mass of epoxy resin, further ground, and photographed with a scanning electron microscope. The resulting images of a plurality of spots were processed and analyzed to determine the particle size distribution of silica particles 1. R, $D_{97.5}$, and Ru were confirmed to be substantially equivalent to the numerical values.

[Production of Coated Metal Sheets 2 and 3]

Coated metal sheet 2 was produced in the same manner as coated metal sheet 1 except that the amount of the overcoat coating material deposited was changed such that the dry film thickness T reached 10 μm. Additionally, coated metal sheet 3 was produced in the same manner as coated metal sheet 1 except that the amount of the overcoat coating material deposited was changed such that the dry film thickness T reached 9 μm.

[Production of Coated Metal Sheets 4 to 7]

Coated metal sheet 4 was produced in the same manner as coated metal sheet 1 except that silica particles 2 were used instead of silica particles 1 as the gloss adjusting agent in the overcoat coating material. Silica particles 2 are a classified material or its mixture, wherein R is 5.0 μm, $D_{97.5}$ is 7.6 μm, and Ru is 11.0 μm.

Additionally, coated metal sheet 5 was produced in the same manner as coated metal sheet 1 except that silica particles 3 were used instead of silica particles 1 as the gloss adjusting agent in the overcoat coating material. Silica particles 3 are a classified material or its mixture, wherein R is 5.0 μm, $D_{97.5}$ is 7.6 μm, and Ru is 13.0 μm.

Additionally, coated metal sheet 6 was produced in the same manner as coated metal sheet 1 except that silica particles 4 were used instead of silica particles 1 as the gloss adjusting agent in the overcoat coating material. Silica particles 4 are a classified material or its mixture, for example, wherein R is 5.0 μm, $D_{97.5}$ is 7.6 μm, and Ru is 14.0 μm.

Additionally, coated metal sheet 7 was produced in the same manner as coated metal sheet 1 except that silica particles 5 were used instead of silica particles 1 as the gloss adjusting agent in the overcoat coating material. Silica particles 5 are a classified material or its mixture, for example, wherein R is 5.0 μm, $D_{97.5}$ is 7.6 μm, and Ru is 14.8 μm.

[Production of Coated Metal Sheets 8 to 10]

Coated metal sheet 8 was produced in the same manner as coated metal sheet 1 except that silica particles 6 were used instead of silica particles 1 as the gloss adjusting agent in the overcoat coating material. Silica particles 6 are a classified material or its mixture, for example, wherein R is 3.0 µm, $D_{97.5}$ is 5.6 µm, and Ru is 9.5 µm.

Additionally, coated metal sheet 9 was produced in the same manner as coated metal sheet 1 except that silica particles 7 were used instead of silica particles 1 as the gloss adjusting agent in the overcoat coating material. Silica particles 7 are a classified material or its mixture, for example, wherein R is 2.0 µm, $D_{97.5}$ is 4.6 µm, and Ru is 9.5 µm.

Additionally, coated metal sheet 10 was produced in the same manner as coated metal sheet 1 except that silica particles 8 were used instead of silica particles 1 as the gloss adjusting agent in the overcoat coating material. Silica particles 8 are a classified material or its mixture, for example, wherein R is 0.5 µm, $D_{97.5}$ is 2.1 µm, and Ru is 4.5 µm.

[Production of Coated Metal Sheets 11 to 15]

Coated metal sheet 11 was produced in the same manner as coated metal sheet 8 except that the amount of the overcoat coating material deposited was changed such that the dry film thickness T reached 9 µm. Additionally, coated metal sheet 12 was produced in the same manner as coated metal sheet 8 except that the amount of the overcoat coating material deposited was changed such that the dry film thickness T reached 8 µm. Additionally, coated metal sheet 13 was produced in the same manner as coated metal sheet 8 except that the amount of the overcoat coating material deposited was changed such that the dry film thickness T reached 15 µm. Additionally, coated metal sheet 14 was produced in the same manner as coated metal sheet 8 except that the amount of the overcoat coating material deposited was changed such that the dry film thickness T reached 19 µm. Additionally, coated metal sheet 15 was produced in the same manner as coated metal sheet 8 except that the amount of the overcoat coating material deposited was changed such that the dry film thickness T reached 21 µm.

[Production of Coated Metal Sheets 16 to 18]

Coated metal sheet 16 was produced in the same manner as coated metal sheet 1 except that silica particles 18 were used instead of silica particles 1 as the gloss adjusting agent in the overcoat coating film, and the amount of the overcoat coating material deposited was changed such that the dry film thickness T reached 3 µm. Silica particles 18 are a classified material or its mixture, for example, wherein R is 1.0 µm, $D_{97.5}$ is 2.0 µm, and Ru is 2.6 µm.

Additionally, coated metal sheet 17 was produced in the same manner as coated metal sheet 1 except that silica particles 19 were used instead of silica particles 1 as the gloss adjusting agent in the overcoat coating material, and the amount of the overcoat coating material deposited was changed such that the dry film thickness T reached 2 µm. Silica particles 19 are a classified material or its mixture, for example, wherein R is 1.0 µm, $D_{97.5}$ is 1.4 µm, and Ru is 1.5 µm.

Furthermore, coated metal sheet 18 was produced in the same manner as coated metal sheet 8 except that the amount of the overcoat coating material deposited was changed such that the dry film thickness T reached 20 µm.

[Production of Coated Metal Sheets 19 to 25]

Coated metal sheet 19 was produced in the same manner as coated metal sheet 1 except that no silica particles in the overcoat coating material were blended. Additionally, coated metal sheet 20 was produced in the same manner as coated metal sheet 1 except that the content of the silica particles in the overcoat coating material was changed to 0.005 vol %. Additionally, coated metal sheet 21 was produced in the same manner as coated metal sheet 1 except that the content of the silica particles in the overcoat coating material was changed to 0.01 vol %. Additionally, coated metal sheet 22 was produced in the same manner as coated metal sheet 1 except that the content of the silica particles in the overcoat coating material was changed to 0.1 vol %. Additionally, coated metal sheet 23 was produced in the same manner as coated metal sheet 1 except that the content of the silica particles in the overcoat coating material was changed to 10 vol %. Additionally, coated metal sheet 24 was produced in the same manner as coated metal sheet 1 except that the content of the silica particles in the overcoat coating material was changed to 15 vol %. Additionally, coated metal sheet 25 was produced in the same manner as coated metal sheet 1 except that the content of the silica particles in the overcoat coating material was changed to 20 vol %.

[Production of Coated Metal Sheets 26 to 28]

Coated metal sheet 26 was produced in the same manner as coated metal sheet 1 except that the overcoat coating film was formed on base sheet 1 instead of on base sheet 3. Additionally, coated metal sheet 27 was produced in the same manner as coated metal sheet 1 except that the overcoat coating film was formed on base sheet 2 instead of on base sheet 3. Additionally, coated metal sheet 28 was produced in the same manner as coated metal sheet 1 except that the overcoat coating film was formed on base sheet 4 instead of on base sheet 3.

[Production of Coated Metal Sheets 29 and 30]

Coated metal sheet 29 was obtained in the same manner as coated metal sheet 1 except that clear coating material 2 was used instead of clear coating material 1 of the overcoat coating material. Clear coating material 2 is "QK clear coating material" manufactured by Nippon Fine Coatings Co., Ltd., which is a polyester-based coating material (PE). Additionally, coated metal sheet 30 was obtained in the same manner as coated metal sheet 1 except that clear coating material 3 was used instead of clear coating material 1. Clear coating material 3 is "NSC3300 clear coating material" manufactured by Nippon Fine Coatings Co., Ltd., which is a polyester-based coating material (PE).

[Production of Coated Metal Sheets 31 and 32]

Coated metal sheet 31 was produced in the same manner as coated metal sheet 1 except that polyacrylonitrile (PAN) particles were used instead of silica particles 1 of the overcoat coating material. PAN particles are a classified material or its mixture, for example, wherein R is 5.0 µm, $D_{97.5}$ is 7.6 µm, and Ru is 9.5 µm. Additionally, coated metal sheet 32 was produced in the same manner as coated metal sheet 1 except that calcium carbonate-calcium phosphate composite (CaCPC) particles were used instead of silica particles 1 of the overcoat coating material. The CaCPC particles are a classified material or its mixture, wherein R is 5.0 µm, $D_{97.5}$ is 7.6 µm, and Ru is 9.5 µm.

[Production of Coated Metal Sheets 33 and 34]

Coated metal sheet 33 was produced in the same manner as coated metal sheet 4 except that the overcoat coating film was formed on base sheet 4 instead of on base sheet 3. Additionally, coated metal sheet 34 was produced in the same manner as coated metal sheet 5 except that the overcoat coating film was formed on base sheet 4 instead of on base sheet 3.

[Production of Coated Metal Sheet 35]

Coated metal sheet 35 was produced in the same manner as coated metal sheet 1 except that base sheet 5 was used instead of base sheet 3, silica 19 was used instead of silica 1, and the amount of the overcoat coating material deposited was changed such that the dry film thickness T reached 5 µm. Silica particles 19 are a classified material or its mixture, for example, wherein R is 1.0 µm, $D_{97.5}$ is 1.4 µm, and Ru is 1.5 µm.

[Evaluation]

Coated metal sheets 1 to 35 were each subjected to the measurement and test described below.

(1) 60° Glossiness (G)

The specular glossiness at 60° (G60), specified by JIS K5600-4-7 (ISO 2813:1994), of each of coated metal sheets 1 to 35 was measured with Gloss meter VG-2000 manufactured by NIPPON DENSHOKU INDUSTRIES CO., LTD.

(2) Coating Appearance

The appearance of the overcoat coating film of each of coated metal sheets 1 to 35 after drying was evaluated in accordance with the following criteria. A or B would have no practical problem in use.

(Evaluation Criteria)

A: No abnormal glossiness and coating film defects are observed, the coating film is flat, and an enamel appearance is also observed.

B: Slight unevenness is observed on the surface of the coating film, but an enamel appearance can be obtained, and there is no practical problem in use.

C: The gloss is extremely high.

D: The gloss is extremely low.

E: Coating film blistering caused by volatile components on baking the coating film.

F: Concealability is lacking.

(3) Processed Part Adhesiveness

Coated metal sheets 1 to 35 were each subjected to 0T bending (adhesion bending), and the 0T bended portion was subjected to cellophane tape-peeling test and evaluated in accordance with the following criteria.

(Evaluation Criteria)

G: Peeling of the coating film is not observed.

NG: Peeling of the coating film is observed.

(4) Flat Portion-Corrosion Resistance

First, coated metal sheets 1 to 35 were each subjected to the xenon lamp method-accelerated weathering test specified by JIS K5600-7-7 (ISO11341: 2004) for 1,000 hours. Then, each sheet was subjected to the "neutral salt water spray cycle test" specified by JIS H8502 (so-called JASO method) for 720 hours. The above-described two tests were conducted as one cycle. Test products subjected to one cycle (corresponding to about five-year service life in actual use) and test products subjected to two cycles (corresponding to about 10-year service life) each for coated metal sheets 1 to 35 were washed with water. After observed for the presence or absence of coating film blistering at the flat portion of the coated metal sheet by visual observation and magnified observation with a loupe having a magnification of 10, the sheets were evaluated in accordance with the following criteria. A or B would have no practical problem in use.

(Evaluation Criteria)

A: No blistering is observed.

B: Slightly subtle blistering is observed by magnified observation, but no blistering is visually observed.

C: Blistering is visually observed.

The base sheet type, the gloss adjusting agent type, R, $D_{97.5}$, Ru, the overcoat coating film resin type, T, the content of the gloss adjusting agent, the value of $D_{97.5}/T$, the value of Ru/T, and Example/Comparative Example of coated metal sheets 1 to 35 are shown in Table 1 and Table 2. The evaluation results of coated metal sheets 1 to 35 are also shown in Table 3.

TABLE 1

| Coated metal sheet No. | Base sheet | Gloss adjusting agent | | | | Overcoat coating film | | | $D_{97.5}/T$ (—) | Ru/T (—) | Remark |
|---|---|---|---|---|---|---|---|---|---|---|---|
| | | Type | R (µm) | $D_{97.5}$ (µm) | Ru (µm) | Resin type | T (µm) | Content (vol %) | | | |
| 1 | 3 | Silica 1 | 5.0 | 7.6 | 9.5 | PE | 11 | 1.0 | 0.69 | 0.86 | Example |
| 2 | 3 | Silica 1 | 5.0 | 7.6 | 9.5 | PE | 10 | 1.0 | 0.76 | 0.95 | Comparative Example |
| 3 | 3 | Silica 1 | 5.0 | 7.6 | 9.5 | PE | 9 | 1.0 | 0.84 | 1.05 | Comparative Example |
| 4 | 3 | Silica 2 | 5.0 | 7.6 | 11.0 | PE | 11 | 1.0 | 0.69 | 1.00 | Example |
| 5 | 3 | Silica 3 | 5.0 | 7.6 | 13.0 | PE | 11 | 1.0 | 0.69 | 1.18 | Example |
| 6 | 3 | Silica 4 | 5.0 | 7.6 | 14.0 | PE | 11 | 1.0 | 0.69 | 1.27 | Comparative Example |
| 7 | 3 | Silica 5 | 5.0 | 7.6 | 14.8 | PE | 11 | 1.0 | 0.69 | 1.35 | Comparative Example |
| 8 | 3 | Silica 6 | 3.0 | 5.6 | 9.5 | PE | 11 | 1.0 | 0.51 | 0.86 | Example |
| 9 | 3 | Silica 7 | 2.0 | 4.6 | 9.5 | PE | 11 | 1.0 | 0.42 | 0.86 | Example |
| 10 | 3 | Silica 8 | 0.5 | 2.1 | 4.5 | PE | 11 | 1.0 | 0.19 | 0.41 | Comparative Example |
| 11 | 3 | Silica 6 | 3.0 | 5.6 | 9.5 | PE | 9 | 1.0 | 0.62 | 1.05 | Example |
| 12 | 3 | Silica 6 | 3.0 | 5.6 | 9.5 | PE | 8 | 1.0 | 0.70 | 1.19 | Example |
| 13 | 3 | Silica 6 | 3.0 | 5.6 | 9.5 | PE | 15 | 1.0 | 0.37 | 0.63 | Example |
| 14 | 3 | Silica 6 | 3.0 | 5.6 | 9.5 | PE | 19 | 1.0 | 0.29 | 0.50 | Example |
| 15 | 3 | Silica 6 | 3.0 | 5.6 | 9.5 | PE | 21 | 1.0 | 0.27 | 0.45 | Comparative Example |
| 16 | 3 | Silica 18 | 1.0 | 2.0 | 2.6 | PE | 3 | 1.0 | 0.67 | 0.87 | Example |
| 17 | 3 | Silica 19 | 1.0 | 1.4 | 1.5 | PE | 2 | 1.0 | 0.70 | 0.75 | Comparative Example |
| 18 | 3 | Silica 6 | 3.0 | 5.6 | 9.5 | PE | 20 | 1.0 | 0.28 | 0.48 | Example |

TABLE 2

| Coated metal sheet No. | Base sheet | Gloss adjusting agent | | | | Overcoat coating film | | | $D_{97.5}/T$ (—) | Ru/T (—) | Remark |
|---|---|---|---|---|---|---|---|---|---|---|---|
| | | Type | R (μm) | $D_{97.5}$ (μm) | Ru (μm) | Resin type | T (μm) | Content (vol %) | | | |
| 19 | 3 | — | — | — | — | — | 11 | 0 | — | — | Comparative Example |
| 20 | 3 | Silica 1 | 5.0 | 7.6 | 9.5 | PE | 11 | 0.005 | 0.69 | 0.86 | Comparative Example |
| 21 | 3 | Silica 1 | 5.0 | 7.6 | 9.5 | PE | 11 | 0.01 | 0.69 | 0.86 | Example |
| 22 | 3 | Silica 1 | 5.0 | 7.6 | 9.5 | PE | 11 | 0.1 | 0.69 | 0.86 | Example |
| 23 | 3 | Silica 1 | 5.0 | 7.6 | 9.5 | PE | 11 | 10 | 0.69 | 0.86 | Example |
| 24 | 3 | Silica 1 | 5.0 | 7.6 | 9.5 | PE | 11 | 15 | 0.69 | 0.86 | Example |
| 25 | 3 | Silica 1 | 5.0 | 7.6 | 9.5 | PE | 11 | 20 | 0.69 | 0.86 | Comparative Example |
| 26 | 1 | Silica 1 | 5.0 | 7.6 | 9.5 | PE | 11 | 1.0 | 0.69 | 0.86 | Example |
| 27 | 2 | Silica 1 | 5.0 | 7.6 | 9.5 | PE | 11 | 1.0 | 0.69 | 0.86 | Example |
| 28 | 4 | Silica 1 | 5.0 | 7.6 | 9.5 | PE | 11 | 1.0 | 0.69 | 0.86 | Example |
| 29 | 3 | Silica 1 | 5.0 | 7.6 | 9.5 | PE | 11 | 1.0 | 0.69 | 0.86 | Example |
| 30 | 3 | Silica 1 | 5.0 | 7.6 | 9.5 | PE | 11 | 1.0 | 0.69 | 0.86 | Example |
| 31 | 3 | PAN | 5.0 | 7.6 | 9.5 | PE | 11 | 1.0 | 0.69 | 0.86 | Example |
| 32 | 3 | CaCPC | 5.0 | 7.6 | 9.5 | PE | 11 | 1.0 | 0.69 | 0.86 | Example |
| 33 | 4 | Silica 2 | 5.0 | 7.6 | 11.0 | PE | 11 | 1.0 | 0.69 | 1.00 | Example |
| 34 | 4 | Silica 3 | 5.0 | 7.6 | 13.0 | PE | 11 | 1.0 | 0.69 | 1.18 | Example |
| 35 | 5 | Silica 19 | 1.0 | 1.4 | 1.5 | PE | 5 | 1.0 | 0.28 | 0.30 | Example |

TABLE 3

| Coated metal sheet No. | G60 (—) | Coating appearance | Processed part adhesiveness | Flat portion-corrosion resistance | | Remark |
|---|---|---|---|---|---|---|
| | | | | 1 cycle | 2 cycle | |
| 1 | 57 | A | G | A | A | Example |
| 2 | 60 | A | G | B | C | Comparative Example |
| 3 | 60 | A | G | C | C | Comparative Example |
| 4 | 58 | A | G | B | B | Example |
| 5 | 57 | A | G | B | B | Example |
| 6 | 56 | A | G | B | C | Comparative Example |
| 7 | 55 | A | G | C | C | Comparative Example |
| 8 | 70 | A | G | A | A | Example |
| 9 | 80 | A | G | A | A | Example |
| 10 | 88 | C | G | — | — | Comparative Example |
| 11 | 70 | A | G | B | B | Example |
| 12 | 50 | B | G | B | B | Example |
| 13 | 70 | A | G | A | A | Example |
| 14 | 70 | A | G | A | A | Example |
| 15 | 70 | E | NG | — | — | Comparative Example |
| 16 | 35 | A | G | B | B | Example |
| 17 | 25 | F | G | — | — | Comparative Example |
| 18 | 70 | A | G | A | A | Example |
| 19 | 87 | C | G | A | A | Comparative Example |
| 20 | 87 | C | G | A | A | Comparative Example |
| 21 | 85 | A | G | A | A | Example |
| 22 | 80 | A | G | A | A | Example |
| 23 | 54 | A | G | A | A | Example |
| 24 | 25 | A | G | A | A | Example |
| 25 | 7 | D | NG | — | — | Comparative Example |
| 26 | 60 | A | G | B | B | Example |
| 27 | 60 | A | G | A | B | Example |
| 28 | 60 | A | G | A | A | Example |
| 29 | 60 | A | G | A | A | Example |
| 30 | 60 | A | G | A | A | Example |
| 31 | 60 | A | G | B | B | Example |
| 32 | 60 | A | G | B | B | Example |
| 33 | 58 | A | G | A | B | Example |
| 34 | 58 | A | G | A | B | Example |
| 35 | 65 | A | G | A | A | Example |

(5) Flat Portion-Corrosion Resistance

Coated metal sheets 1, 28, 33, and 34 were each subjected to up to three cycles of the aforementioned test according to flat portion-corrosion resistance (corresponding to about 15-year service life in actual use), and test products subjected to three cycles were each washed with water. After observed for the presence or absence of coating film blistering at the flat portion of the coated metal sheet by visual observation and magnified observation with a loupe having a magnification of 10, the sheets were evaluated in accordance with the aforementioned criteria. The results are shown in Table 4.

TABLE 4

| Coated metal sheet No. | Flat portion-corrosion resistance | | | Remark |
|---|---|---|---|---|
| | 1 cycle | 2 cycle | 3 cycle | |
| 1 | A | A | B | Example |
| 28 | A | A | A | Example |
| 33 | A | A | A | Example |
| 34 | A | A | A | Example |

Reference Experiment 1

Particles having a particle diameter of 0.7T μm (T=11 μm) or more were removed from silica particles 1 to obtain silica particles 1 substantially containing no particles of 7.7 μm or more. These particles are referred to as silica particles 9. Then, coated metal sheet 36 was produced in the same manner as coated metal sheet 1 except that silica particles 9 were used instead of silica particles 1 as the gloss adjusting agent in the overcoat coating material.

Additionally, particles having a particle diameter R' of 0.8T μm (8.8 μm) or more were removed to separately provide silica particles A substantially containing no particles of 8.8 μm or more. Into 97.5 parts by volume of silica particles 9, 2.5 parts by volume of silica particles A was mixed to obtain silica particles composed of 97.5 parts by volume of silica particles 9 of 0.7T or less and 2.5 parts by volume of silica particles A of 0.8T or less (content ratio: 97.5/2.5). These particles are referred to as silica particles 10. Then, coated metal sheet 37 was produced in the same manner as coated metal sheet 1 except that silica particles 10 were used instead of silica particles 1 as the gloss adjusting agent in the overcoat coating material.

Additionally, particles having a particle diameter R' of 0.9T μm (9.9 μm) or more were removed to separately provide silica particles B substantially containing no particles of 9.9 μm or more. Into 97.5 parts by volume of silica particles 9, 2.5 parts by volume of silica particles B was mixed to obtain silica particles composed of 97.5 parts by volume of silica particles 9 of 0.7T or less and 2.5 parts by volume of silica particles B of 0.9T or less. These particles are referred to as silica particles 11. Then, coated metal sheet 38 was produced in the same manner as coated metal sheet 1 except that silica particles 11 were used instead of silica particles 1 as the gloss adjusting agent in the overcoat coating material.

Additionally, particles having a particle diameter R of 1.0T μm (11.0 μm) or more were removed to separately provide silica particles C substantially containing no particles of 11.0 μm or more. Into 97.5 parts by volume of silica particles 9, 2.5 parts by volume of silica particles C was mixed to obtain silica particles composed of 97.5 parts by volume of silica particles 9 of 0.7T or less and 2.5 parts by volume of silica particles C of 1.0T or less. These particles are referred to as silica particles 12. Then, coated metal sheet 39 was produced in the same manner as coated metal sheet 1 except that silica particles 12 were used instead of silica particles 1 as the gloss adjusting agent in the overcoat coating material.

Additionally, particles having a particle diameter R' of 1.1T μm (12.1 μm) or more were removed to separately provide silica particles D substantially containing no particles of 12.1 μm or more. Into 97.5 parts by volume of silica particles 9, 2.5 parts by volume of silica particles D was mixed to obtain silica particles composed of 97.5 parts by volume of silica particles 9 of 0.7T or less and 2.5 parts by volume of silica particles D of 1.1T or less. These particles are referred to as silica particles 13. Then, coated metal sheet 40 was produced in the same manner as coated metal sheet 1 except that silica particles 13 were used instead of silica particles 1 as the gloss adjusting agent in the overcoat coating material.

Additionally, particles having a particle diameter R' of 1.2T μm (13.2 μm) or more were removed to separately provide silica particles E substantially containing no particles of 13.2 μm or more. Into 97.5 parts by volume of silica particles 9, 2.5 parts by volume of silica particles E was mixed to obtain silica particles composed of 97.5 parts by volume of silica particles 9 of 0.7T or less and 2.5 parts by volume of silica particles E of 1.2T or less. These particles are referred to as silica particles 14. Then, coated metal sheet 41 was produced in the same manner as coated metal sheet 1 except that silica particles 14 were used instead of silica particles 1 as the gloss adjusting agent in the overcoat coating material.

Additionally, particles having a particle diameter R' of 1.3T μm (14.3 μm) or more were removed to separately provide silica particles F substantially containing no particles of 14.3 μm or more. Into 97.5 parts by volume of silica particles 9, 2.5 parts by volume of silica particles F was mixed to obtain silica particles composed of 97.5 parts by volume of silica particles 9 of 0.7T or less and 2.5 parts by volume of silica particles F of 1.3T or less. These particles are referred to as silica particles 15. Then, coated metal sheet 42 was produced in the same manner as coated metal sheet 1 except that silica particles 15 were used instead of silica particles 1 as the gloss adjusting agent in the overcoat coating material.

Coated metal sheets 36 to 42 were evaluated for flat portion-corrosion resistance in accordance with the aforementioned method. The base sheet type, the gloss adjusting agent type, R, $D_{97.5}$, the cut value, the particle diameter R' of the main component of the silica particles added, the overcoat coating film resin type, T, the content of the gloss adjusting agent, the content ratio of two types of silica particles, and evaluation results of flat portion-corrosion resistance of coated metal sheets 36 to 42 are shown in Table 5.

TABLE 5

| Coated metal sheet No. | Base sheet | Gloss adjusting agent | | | | Overcoat coating film | | | | Flat portion-corrosion resistance | |
|---|---|---|---|---|---|---|---|---|---|---|---|
| | | Type | R (μm) | $D_{97.5}$ (μm) | Cut value (μm) | R' (μm) | Resin type | T (μm) | Content (vol %) | Content ratio (—) | 1 cycle | 2 cycle |
| 36 | 3 | Silica 9 | 5.0 | 7.6 | 7.7 | — | PE | 11 | 1.0 | 100/0 | A | A |
| 37 | 3 | Silica 10 | 5.0 | 7.6 | 7.7 | 8.8 | PE | 11 | 1.0 | 97.5/2.5 | A | B |

TABLE 5-continued

| Coated metal sheet No. | Base sheet Type | Gloss adjusting agent | | | | Overcoat coating film | | | | Flat portion-corrosion resistance | |
|---|---|---|---|---|---|---|---|---|---|---|---|
| | | Type | R (μm) | $D_{97.5}$ (μm) | Cut value (μm) | R' (μm) | Resin type | T (μm) | Content (vol %) | Content ratio (—) | 1 cycle | 2 cycle |
| 38 | 3 | Silica 11 | 5.0 | 7.6 | 7.7 | 9.9 | PE | 11 | 1.0 | 97.5/2.5 | B | B |
| 39 | 3 | Silica 12 | 5.0 | 7.6 | 7.7 | 11.0 | PE | 11 | 1.0 | 97.5/2.5 | B | B |
| 40 | 3 | Silica 13 | 5.0 | 7.6 | 7.7 | 12.1 | PE | 11 | 1.0 | 97.5/2.5 | B | B |
| 41 | 3 | Silica 14 | 5.0 | 7.6 | 7.7 | 13.2 | PE | 11 | 1.0 | 97.5/2.5 | B | B |
| 42 | 3 | Silica 15 | 5.0 | 7.6 | 7.7 | 14.3 | PE | 11 | 1.0 | 97.5/2.5 | B | C |

Reference Experiment 2

Silica particles composed of 97.0 parts by volume of silica particles 9 of 0.7T or less and 3.0 parts by volume of silica particles E of 1.2T or less were obtained by changing the content ratio between silica particles 9 and silica particles E in silica particles 14. These particles are referred to as silica particles 16. Then, coated metal sheet 43 was produced in the same manner as coated metal sheet 1 except that silica particles 16 were used instead of silica particles 1 as the gloss adjusting agent in the overcoat coating material.

Additionally, silica particles composed of 96.5 parts by volume of silica particles 9 of 0.7T or less and 3.5 parts by volume of silica particles E of 1.2T or less were obtained by changing the content ratio between silica particles 9 and silica particles E in silica particles 14. These particles are referred to as silica particles 17. Then, coated metal sheet 44 was produced in the same manner as coated metal sheet 1 except that silica particles 17 were used instead of silica particles 1 as the gloss adjusting agent in the overcoat coating material.

Coated metal sheets 43 and 44 were evaluated for flat portion-corrosion resistance in accordance with the aforementioned two-cycle method. The base sheet type, the gloss adjusting agent type, R, $D_{97.5}$, the cut value, the particle diameter R' of the main component of the silica particles added, the overcoat coating film resin type, T, the content of the gloss adjusting agent, the content ratio of two types of silica particles, and evaluation results of flat portion-corrosion resistance of coated metal sheets 41, 43, and 44 are shown in Table 6.

As clear from Table 1 to Table 3, coated metal sheets 1, 4, 5, 8, 9, 11 to 14, 16, 18, 21 to 24, and 26 to 35 all have designability of an enamel-like gloss, have sufficient processed-part adhesiveness, and additionally have flat portion-corrosion resistance corresponding to 10 years of actual use.

In contrast, coated metal sheets 2, 3, 6, and 7 had insufficient flat portion-corrosion resistance. It is conceivable that this is because the gloss adjusting agent was exposed from the overcoat coating film during the durability test due to optical degradation of the overcoat coating film.

Furthermore, the coated metal sheet 10 has an extremely high gloss, and the intended designability (enamel-like appearance) could not be achieved. It is conceivable that this was because the particle diameter of the gloss adjusting agent was extremely small. In the coated metal sheet 10, the intended designability could not be achieved. Thus, it was determined that coated metal sheet 10 did not deserve to be subject to evaluation test of flat portion-corrosion resistance, and the evaluation test was not conducted.

Additionally, coated metal sheet 15 had blistering caused by volatile components on baking the overcoat coating film and had also insufficient processed-part adhesiveness. Thus, it was not possible to conduct evaluation test of flat portion-corrosion resistance. It is conceivable that this is because the film thickness of the overcoat coating film was extremely thick.

Additionally, coated metal sheet 17 had insufficient concealability. In other words, the visibility of the overcoat coating film was developed only to the extent where the

TABLE 6

| Coated metal sheet No. | Base sheet Type | Gloss adjusting agent | | | | Overcoat coating film | | | | Flat portion-corrosion resistance | |
|---|---|---|---|---|---|---|---|---|---|---|---|
| | | Type | R (μm) | $D_{97.5}$ (μm) | Cut value (μm) | R' (μm) | Resin type | T (μm) | Content (vol %) | Content ratio (—) | 1 cycle | 2 cycle |
| 41 | 3 | Silica 14 | 5.0 | 7.6 | 7.7 | 13.2 | PE | 11 | 1.0 | 97.5/2.5 | B | B |
| 43 | 3 | Silica 16 | 5.0 | 7.6 | 7.7 | 13.2 | PE | 11 | 1.0 | 97.0/3.0 | B | C |
| 44 | 3 | Silica 17 | 5.0 | 7.6 | 7.7 | 13.2 | PE | 11 | 1.0 | 96.5/3.5 | B | C |

Reference Experiment 3

Coated metal sheet 45 was produced in the same manner as coated metal sheet 42 except that the overcoat coating material for coated metal sheet 42 was used after treated with a roller mill under conditions for pulverizing silica particles F. Then, coated metal sheet 45 was evaluated for flat portion-corrosion resistance in accordance with the aforementioned method, and graded B both in the one-cycle test and the two-cycle test.

substrate of the overcoat coating film (undercoat coating film) was visually observed, and the intended designability could not achieved. Thus, it was determined that coated metal sheet 4 did not deserve to be subject to evaluation test of flat portion-corrosion resistance, and the evaluation test was not conducted. It is conceivable that the reason why the concealability was insufficient is that the film thickness of the overcoat coating film was extremely thin as well as the particle diameter of the gloss adjusting agent was extremely small.

Furthermore, the coated metal sheets 19 and 20 has an extremely high gloss, and the intended designability (enamel-like appearance) could not be achieved. It is conceivable that coated metal sheet 19 had an extremely high gloss because the overcoat coating film contained no gloss adjusting agent, and that coated metal sheet 20 had an extremely high gloss because the content of the gloss adjusting agent was too low to adjust the gloss.

Alternatively, coated metal sheet 25 had an extremely low gloss as well as had insufficient processed-part adhesiveness. Thus, it was not possible to conduct evaluation test of flat portion-corrosion resistance. It is conceivable that this is because the content of the gloss adjusting agent in the overcoat coating film was extremely high.

Additionally, coated metal sheets 26 to 28 all exhibited the intended designability (enamel gloss) irrespective of the type of the base sheet as well as had sufficient processed part-adhesiveness and flat portion-corrosion resistance. It is conceivable that this is because flat portion-corrosion resistance is provided by the overcoat coating film.

Additionally, coated metal sheets 29 and 30 both exhibited the intended designability (enamel gloss) irrespective of the type of the resin of the overcoat coating film as well as had sufficient processed part-adhesiveness and flat portion-corrosion resistance. It is conceivable that this is because a resin having sufficient durability to be used for the overcoat coating film would exhibit flat portion-corrosion resistance irrespective of the type of the resin constituting the overcoat coating film.

Additionally, coated metal sheets 31 and 32 both exhibited the intended designability (enamel gloss) irrespective of the type of the gloss adjusting agent as well as had sufficient processed part-adhesiveness and flat portion-corrosion resistance. It is conceivable that this is because even particles having micropores, if not exposed from the surface of the overcoat coating film, would exhibit sufficient flat portion-corrosion resistance, whether the particles are inorganic particles or organic particles.

Also as clear from Table 4, coated metal sheets 28, 33, and 34 all maintain flat portion-corrosion resistance for a period longer than coated metal sheet 1. It is conceivable that this is because base sheet 4 in coated metal sheets 28, 33, and 34, which contains a chromate-based anti-rust pigment in the undercoat coating film and of which plated steel sheet has been subjected to chromate anti-rust treatment, has higher corrosion resistance than that of base sheet 1 in coated metal sheet 1.

Also it is obvious from Table 5 and Table 6, it can be seen that the gloss adjusting agent has no substantially adverse influence on the flat portion-corrosion resistance of the coated metal sheet even if particles larger than 0.7T are contained, provided that the content of the particles is 2.5 vol % or less based on the total and that the particle diameter of the particles is 1.2 times (1.2T) or less the film thickness of the overcoat coating film. It is conceivable that this is because particles slightly larger than the film thickness T of the overcoat coating film are likely to be oriented such that their long diameter is along the direction in which the overcoat coating material is applied and, if in a small amount, will be sufficiently and continuously covered with the resin of the overcoat coating film for the intended use period.

The gloss adjusting agent may also contain large particles which may be detected in a position deviating from its particle size distribution (coarse particles), although in a small amount. It is conceivable that such coarse particles, as clear from Table 5, are exposed from the overcoat coating film in durable use to cause impairment in the flat portion-corrosion resistance of the coated metal sheet. However, when the overcoat coating material containing the coarse particles is subjected to an appropriate pulverizing step, a coated metal sheet having sufficient flat portion-corrosion resistance can be obtained. It is conceivable that this is because the coarse particles are finely pulverized in the overcoat coating material to a degree enough for the coated metal sheet to exhibit the intended portion-corrosion resistance.

This application is entitled to and claims the benefit of Japanese Patent Application 2014-111302, filed on May 29, 2014, and Japanese Patent Application 2014-164256, filed on Aug. 12, 2014, the disclosures of which including the specifications, drawings and abstracts are incorporated herein by reference in their entirety.

INDUSTRIAL APPLICABILITY

In the coated metal sheet according to the present invention, reduction in the corrosion resistance in the flat portion, attributable to exposure, collapse and fall-off of the gloss adjusting agent from the overcoat coating film, is prevented. Thus, a coated metal sheet that exhibits the intended appearance and corrosion resistance for a long period can be obtained, even if used in an exterior application for a long period. Accordingly, the present invention is expected to further prolong the life of coated metal sheets for exterior use and to further enhance its usage.

REFERENCE SIGNS LIST

11 Base steel sheet
12 Coating film
15 Gloss adjusting agent
22 Overcoat coating film

The invention claimed is:

1. A coated metal sheet comprising a metal sheet and an overcoat coating film to be disposed on the metal sheet,
    wherein the overcoat coating film comprises particles having micropores as a gloss adjusting agent,
    wherein the content of the gloss adjusting agent in the overcoat coating film is from 0.01 to 15 vol %, and
    wherein the coated metal sheet satisfies the following expressions:

$D_{97.5}/T \leq 0.7$ $Ru \leq 1.2T$ $R \geq 1.0$ $3 \leq T \leq 20$ wherein R (μm) is a number average particle diameter of the gloss adjusting agent, T (μm) is a film thickness of the overcoat coating film, $D_{97.5}$ (μm) is a 97.5% particle diameter in an accumulated particle size distribution of the gloss adjusting agent based on the number of particles, and Ru (μm) is an upper limit particle diameter in a number particle size distribution of the gloss adjusting agent.

2. The coated metal sheet according to claim 1, wherein the R is 2.0 or more, and the T is 9 or more and 19 or less.

3. The coated metal sheet according to claim 1, wherein the Ru is less than T.

4. The coated metal sheet according to claim 1, wherein the metal sheet has been subjected to non-chromate anti-rust treatment, and the coated metal sheet is chromate-free.

5. The coated metal sheet according to claim 1, wherein the metal sheet has been subjected to chromate anti-rust treatment.

6. The coated metal sheet according to claim 1, wherein the gloss adjusting agent is silica particles.

7. The coated metal sheet according to claim 1, further comprising an undercoat coating film between the metal sheet and the overcoat coating film.

8. The coated metal sheet according to claim 7, further comprising an intercoat coating film between the undercoat coating film and the overcoat coating film.

9. The coated metal sheet according to claim 1, having a glossiness at 60° is 20 to 85.

10. The coated metal sheet according to claim 1, being a coated metal sheet for exterior use.

11. An exterior building material composed of the coated metal sheet according to claim 1.

12. A method for producing a coated metal sheet comprising a metal sheet and an overcoat coating film to be disposed on the metal sheet, comprising the steps of:
applying an overcoat coating material containing a resin and a gloss adjusting agent onto the metal sheet; and
curing the coating film of the overcoat coating material to form the overcoat coating film;
wherein the content of the gloss adjusting agent in the overcoat coating film is from 0.01 to 15 vol %,
wherein the gloss adjusting agent is particles having micropores, and
wherein the gloss adjusting agent which satisfies the following expressions is employed:

$$D_{97.5}/T \leq 0.7$$

$$Ru \leq 1.2T$$

$$R \geq 1.0$$

$$3 \leq T \leq 20$$

wherein R (μm) is a number average particle diameter of the gloss adjusting agent, T (μm) is a film thickness of the overcoat coating film, $D_{97.5}$ (μm) is a 97.5% particle diameter in an accumulated particle size distribution of the gloss adjusting agent based on the number of particles, and Ru (μm) is an upper limit particle diameter in a number particle size distribution of the gloss adjusting agent.

13. The method for producing a coated metal sheet according to claim 12, wherein the R is 2.0 or more, and the T is 9 or more and 19 or less.

14. The method for producing a coated metal sheet according to claim 12, wherein the overcoat coating material has been subjected to treatment for pulverizing the particles in the overcoat coating material.

15. The method for producing a coated metal sheet according to claim 13, wherein the overcoat coating material has been subjected to treatment for pulverizing the particles in the overcoat coating material.

* * * * *